United States Patent
Bruno et al.

(10) Patent No.: US 8,014,532 B2
(45) Date of Patent: Sep. 6, 2011

(54) METHOD AND SYSTEM FOR PROCESSING A SOUND FIELD REPRESENTATION

(75) Inventors: Rémy Bruno, Vitry sur Seine (FR);
Arnaud Laborie, Vitry sur Seine (FR);
Sébastien Montoya, Paris (FR)

(73) Assignee: Trinnov Audio, Villejuif (FR)

( * ) Notice: Subject to any disclaimer, the term of this patent is extended or adjusted under 35 U.S.C. 154(b) by 883 days.

(21) Appl. No.: 10/528,762

(22) PCT Filed: Sep. 22, 2003

(86) PCT No.: PCT/FR03/02784
§ 371 (c)(1),
(2), (4) Date: Sep. 23, 2005

(87) PCT Pub. No.: WO2004/027642
PCT Pub. Date: Apr. 1, 2004

(65) Prior Publication Data
US 2006/0126852 A1    Jun. 15, 2006

(30) Foreign Application Priority Data

Sep. 23, 2002 (FR) .................................. 02 11739

(51) Int. Cl.
*H04R 5/00* (2006.01)
(52) U.S. Cl. .......................................... 381/17; 700/94
(58) Field of Classification Search .............. 381/17–24, 381/26, 27, 61, 63, 103, 1, 304, 337, 339, 381/340, 182, 92, 71.11, 71.1, 71.8; 84/723, 84/601, 600, 705, 706; 700/94
See application file for complete search history.

(56) References Cited

U.S. PATENT DOCUMENTS

| | | | |
|---|---|---|---|
| 5,671,287 A * | 9/1997 | Gerzon ............................ | 381/17 |
| 6,740,805 B2 * | 5/2004 | Metcalf ........................... | 84/723 |
| 6,904,152 B1 * | 6/2005 | Moorer ............................ | 381/18 |
| 7,088,099 B2 * | 8/2006 | Doddrell et al. ............... | 324/309 |
| 7,231,054 B1 * | 6/2007 | Jot et al. ......................... | 381/310 |
| 2003/0147539 A1 * | 8/2003 | Elko et al. ...................... | 381/92 |
| 2005/0238177 A1 * | 10/2005 | Bruno et al. ..................... | 381/18 |

OTHER PUBLICATIONS

Jaskula Marek: "New windows family based on modified Legendre ploynomials" 19th IEEE Instrumentation and Measurement Technology Conference; Anchorage, AK, U.S., May 21-23, 2002, vol. 1, May 21, 2002, pp. 553-556 XP002248109.

Fox P. D. et al. "Modeling of CW annular arrays using limited diffraction Bessel beams", IEEE Transaction on Ultrasonics, Ferroelectrics and Frequency Control, Jan. 2002, IEEE, USA., vol. 49, No. 1, Jan. 2, 2002, pp. 85-93, XP002248110.

Gumerov N. A. et al. "Modeling the effect of a nearby boundary on the HRTF" 2001 IEEE International Conference on Acoustics, Speech, and Signal Processing. Proceedings (CAT. No. 01CH37221), 2001 IEEE International Conference on Acoustics Speed, and Signal Processing. Proceedings, Salt Lake City, UT, USA, May 7-11, 2001, May 7, 2001, pp. 3337-3340, XP002248111.

\* cited by examiner

*Primary Examiner* — Vivian Chin
*Assistant Examiner* — Lun-See Lao
(74) *Attorney, Agent, or Firm* — Young & Thompson

(57) ABSTRACT

A method of processing a sound field representation which can be used to provide a representation which has been modified by at least spatial processing. The method includes: the establishment of an initial representation of the sound field and the establishment of a representation which has been modified by filtering combinations corresponding to the processing operation. The method also includes a step which defines the processing operation and which includes: a step involving the establishment of a set of directivity functions, which is representative of the processing and which takes the form of a set of coefficients corresponding to the spherical harmonic decomposition of the functions; and a step in which the filtering combinations are determined from the decomposition so that another step involving the application of the defined filtering combinations can be performed.

18 Claims, 5 Drawing Sheets

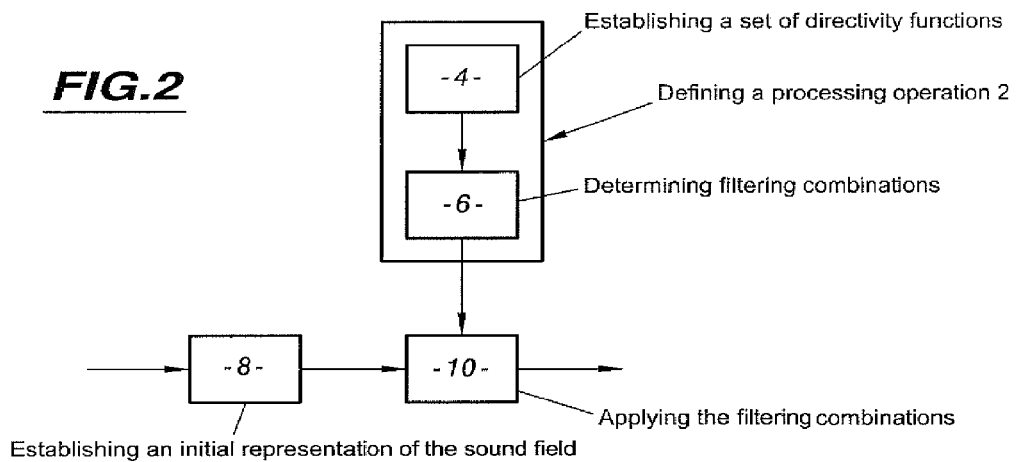
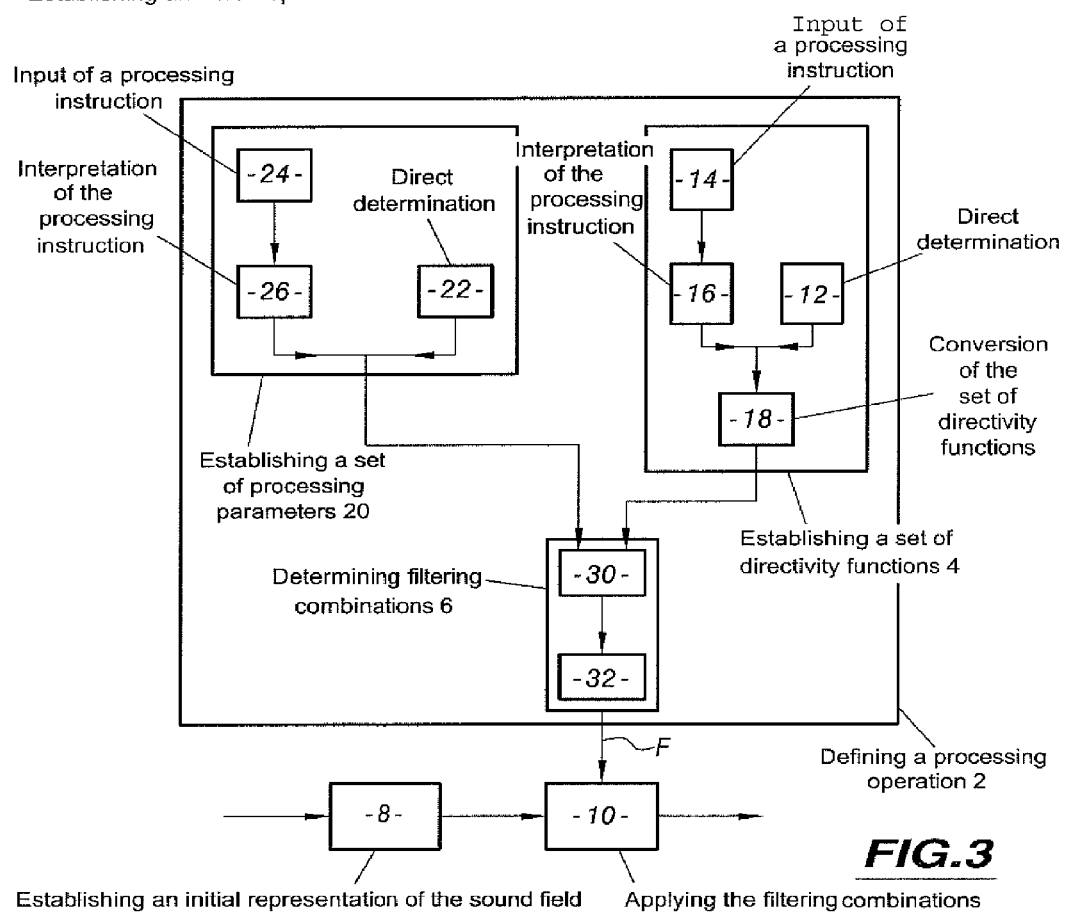

METHOD AND SYSTEM FOR PROCESSING A SOUND FIELD REPRESENTATION

CROSS-REFERENCE TO RELATED APPLICATIONS

The present application claims priority to and incorporates by reference PCT/FR/2003/002784 filed Sep. 22, 2003 and French Patant Application 02/11739 Sep. 23, 2002.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The present invention relates to a method and a system for processing a sound field representation in order to provide a representation of that sound field modified by means of at least spatial processing.

2. Description of Related Art

Methods and systems currently exist which, starting from a sound field representation in the form of coefficients as a function of time and space, enable a modified representation of those coefficients to be provided by linear combinations corresponding to at least spatial processing of the sound field.

However, the possible processing operations are limited and are predetermined in all cases.

For example, the systems grouped under the term <<ambisonic>> use a representation of a sound environment in the form of an angular distribution of virtual sources around a point assimilated to the listening position.

Those systems permit the performance of only specific predetermined modifications, such as an angular distortion on the azimuth, focusing in a privileged direction, or rotation relative to a given axis.

In addition, those systems are limited as regards their precision. Thus, in existing systems, processing operations, such as focusing in any direction, can be applied only to representations limited to a level of precision corresponding to first-order mathematics, that is to say, of poor quality.

It therefore appears that none of the systems of the prior art permits the performance of any modification of a sound field representation in order to obtain a modified representation, especially in the case of an initial representation of excellent quality, for example of high order.

BRIEF SUMMARY OF THE INVENTION

The object of the invention is to overcome that problem by providing a method and a system for processing a sound field representation, permitting the performance of a very wide variety of processing operations.

The invention relates to a method for processing a sound field representation in order to provide a representation modified by the application of this processing corresponding to at least spatial processing of the sound field, comprising:
  the establishment of an initial representation of the sound field in the form of a set of coefficients representative of that field in time and in the three spatial dimensions; and
  the establishment of a representation modified by filtering combinations that correspond to the processing operation and that are applied to the coefficients of the initial representation,
characterized in that it also comprises a step of defining the processing operation, which step comprises:
  a step of establishing a set of directivity functions which is representative of the processing operation, in the form of a set of coefficients corresponding to the decomposition of those functions on a basis of spherical harmonics; and
  a step of determining the filtering combinations on the basis of that decomposition for the implementation of a step of applying the filtering combinations so defined to the coefficients of the initial representation, in order to obtain the modified representation.

According to other features of the invention:
  the step of determining a set of directivity functions comprises a sub-step for the direct determination of all or part of the set of directivity functions in one or other of a plurality of predetermined formats;
  the step of determining a set of directivity functions comprises a sub-step for the automatic interpretation of a processing instruction permitting the automatic provision of all or part of the set of directivity functions in one or other of a plurality of predetermined formats, on the basis of the processing instruction;
  the set of directivity functions which is representative of the processing operation is expressed in accordance with one or other of a plurality of predetermined formats and the step of establishing a set of directivity functions comprises a sub-step of conversion, from the predetermined format, into a set of coefficients corresponding to the decomposition of those directivity functions on a basis of spherical harmonics;
  the step of defining the processing operation also comprises a step of establishing a set of parameters for that processing operation;
  the set of parameters comprises all or some of the following parameters:
    a set of constants forming weighting coefficients and defined as a function of the nature of the processing operation; and
    a parameter specifying the limit order of operation of the method and corresponding to the desired mathematical precision limit;
  the step of establishing a set of parameters comprises a sub-step for the direct determination of all or part of the set of parameters;
  the step of establishing a set of parameters comprises a sub-step for the automatic interpretation of a processing instruction permitting the automatic provision of all or part of the set of parameters on the basis of that processing instruction;
  the step of establishing a set of parameters comprises a sub-step of calculating all or part of the set of constants as a function of the nature of the processing operation;
  the step of determining the filtering combinations comprises at least one sub-step of calculating filtering combinations by means of linear combinations of the coefficients corresponding to the spherical harmonic-based decomposition of the set of directivity functions which is representative of the processing operation;

the sub-step of calculation by means of linear combinations uses the set of constants as weighting coefficients;

the procedure is repeated a plurality of times and the filtering combinations resulting from the various calculation sub-steps are combined with one another to form the filtering combinations that are to be applied to the coefficients of the initial representation;

the result of the calculation sub-step forms directly the filtering combinations that are to be applied to the coefficients of the initial representation;

the processing is convolution processing;

the processing is windowing processing;

the processing comprises at least one distortion to be applied to the initial sound field representation, and all or some of the directivity functions determined during the step of establishing a set of directivity functions form a set of distortion pairs which is representative of the distortion, in the form of a set of coefficients corresponding to the decomposition of the distortion pairs on a basis of spherical harmonics;

the processing comprises a first processing operation, which is referred to as nominal, and the distortion(s), the calculation sub-step providing filtering combinations corresponding to the nominal processing and the step of determining filtering combinations also comprising at least one sub-step of distortion by modifying the filtering combinations provided by the calculation sub-step, on the basis of the distortion pairs representative of the distortion(s), in order to provide the filtering combinations that are to be applied to the coefficients of the initial representation;

the set of parameters comprises a parameter representative of the distortion effort, that is to say, specifying the resemblance between the processing to be applied and the nominal processing;

the processing comprises solely distortion(s), the step of determining the filtering combinations comprising at least one distortion sub-step providing filtering combinations solely on the basis of the distortion pairs representative of the distortion(s), in order to provide the filtering combinations that are to be applied to the coefficients of the initial representation;

it comprises a plurality of distortion sub-steps which are recursive with respect to one another, so that each distortion sub-step receives as an input the filtering combinations provided by the preceding sub-step;

the at least one distortion sub-step comprises an optimization sub-step permitting the determination of the filtering combinations corresponding to modifications to be carried out on portions of the initial representation that are not directly targeted by the distortion pairs;

the processing is split into a plurality of elemental processing operations and at least the step of determining filtering combinations is repeated a plurality of times, the filtering combinations resulting from the various calculation and/or distortion sub-steps and corresponding to the elemental processing operations being arranged amongst one another to form the filtering combinations that are to be applied to the coefficients of the initial representation;

the step of determining the filtering combinations comprises a sub-step of converting the filtering combinations represented in a predetermined format to provide filter parameters suitable for the parameterization of given filters with a view to performing the step of applying the filtering combinations;

the processing is spatial processing and the step of applying the filtering combinations comprises gain modifications applied to the coefficients of the initial representation;

the processing is spatial and frequency processing and the step of applying the filtering combinations comprises the application of filters varying as a function of the frequency to the coefficients of the initial representation;

the sets of coefficients representative of the initial sound field representation and of the modified representation are sets of coefficients called Fourier-Bessel coefficients.

The invention relates also to a device for processing a sound field representation in order to provide a representation of the sound field by applying this processing corresponding to at least spatial processing of the sound field, the device receiving as an input an initial representation of the sound field in the form of a set of coefficients which is representative of that field in time and in the three spatial dimensions and providing as an output a representation modified by the filtering combinations corresponding to the processing applied to the coefficients of the initial representation, characterized in that it comprises means of defining the processing, comprising:

means of establishing a set of directivity functions which is representative of the processing operation, in the form of a set of coefficients corresponding to the decomposition of those directivity functions on a basis of spherical harmonics; and means of determining the filtering combinations on the basis of that decomposition, for their use by filtering means (80) receiving the coefficients of the initial representation as an input and providing the modified representation as an output.

According to other features of the device:

the means of defining the processing operation comprise a module for the direct acquisition of operating data for the device in one or other of a plurality of formats;

the means of defining the processing operation comprise a module for the automatic interpretation of a processing instruction enabling operating data to be provided automatically in one or other of a plurality of predetermined formats;

the operating data comprise the set of directivity functions which is representative of the processing operation:

the means of defining the processing operation comprise a conversion module suitable for converting the set of directivity functions from one or other of a plurality of predetermined formats into a set of coefficients corresponding to the decomposition of those directivity functions on a basis of spherical harmonics;

the operating data comprise a set of parameters for the processing operation;

the means of defining the processing operation comprise a module for calculating all or part of the set of parameters as a function of the nature of the processing operation:

the means of determining the filtering combinations comprise a module for calculating filtering combinations by linear combinations of the coefficients corresponding to the spherical harmonic-based decomposition of the directivity set representative of the processing operation;

the set of processing parameters comprises a set of constants and the module for calculation by linear combinations uses that set of constants as weighting coefficients;

the processing operation comprises at least one distortion, all or part of the set of directivity functions forming a set of distortion pairs corresponding to the distortion(s) to be applied to the initial representation, and the means of determining the filtering combinations also comprise a module for distortion by modification of the filtering combinations provided by the calculation module, on the basis of the distortion pairs, in order to provide the filtering combinations that are to be applied to the coefficients of the initial representation;

the processing operation comprises solely one or more distortions, all or part of the set of directivity functions forming a set of distortion pairs corresponding to the distortion(s) to be applied to the initial representation, and the means of determining the filtering combinations comprise solely a distortion module in order to provide the filtering combinations solely on the basis of the distortion pairs.

BRIEF DESCRIPTION OF THE SEVERAL VIEWS OF THE DRAWINGS

The invention will be better understood on reading the following description which is given purely by way of example and with reference to the appended drawings in which:

FIG. 2 is a general flow chart of the method of the invention;

FIG. 3 is a detailed flow chart of a first embodiment of the invention;

DETAILED DESCRIPTION OF THE INVENTION

Figure 1:
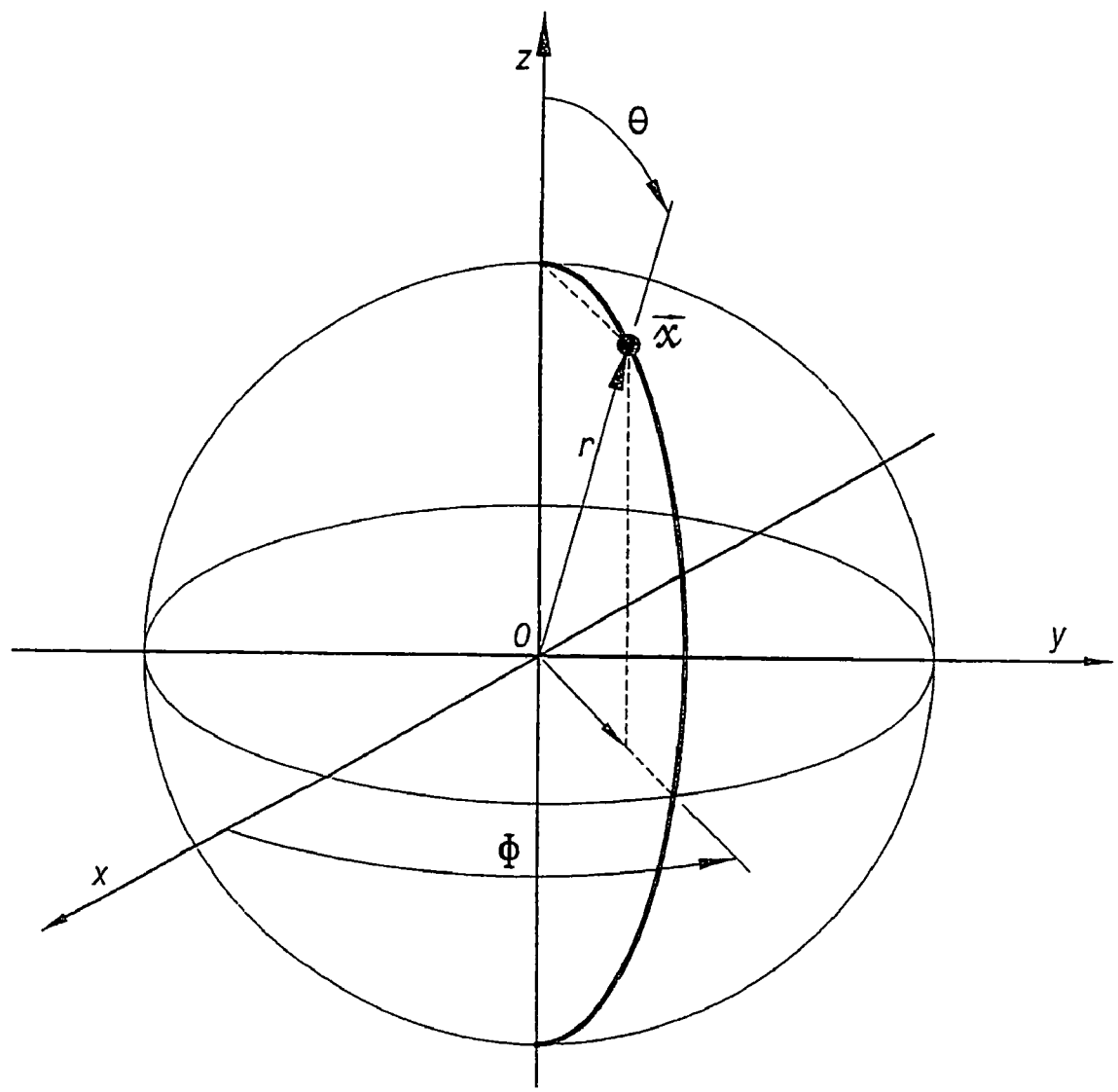
FIG. 1 is a representation of a spherical coordinate system.

FIG. 1 shows a conventional spherical coordinate system in order to clarify the coordinate system to which reference is made in the text.

The coordinate system is an orthonormal coordinate system, having an origin O, and comprises three axes (OX), (OY) and (OZ).

In this coordinate system, a position indicated $\vec{x}$ is described by means of its spherical coordinates $(r,\theta,\phi)$ where r denotes the distance relative to the origin O, $\theta$ the orientation in the vertical plane and $\phi$ the orientation in the horizontal plane.

In such a coordinate system, a sound field is known if the sound pressure indicated $p(r,\theta,\phi,t)$, whose Fourier transform is indicated $P(r,\theta,\phi,f)$ where f denotes the frequency, is defined at all points at each instant t.

The method of the invention is based on the use of spatio-temporal functions enabling any sound field to be described in time and in the three spatial dimensions.

In the embodiments described, those functions are what are known as spherical Fourier-Bessel functions of the first kind and will be referred to hereinafter as Fourier-Bessel functions.

In a region empty of sources and empty of obstacles, the Fourier-Bessel functions correspond to the solutions of the wave equation and constitute a basis which generates all the sound fields produced by sources located outside that region.

Any three-dimensional sound field may therefore be expressed by a linear combination of the Fourier-Bessel functions, in accordance with the following expression:

$$P(r, \theta, \phi, f) = 4\pi \sum_{l=0}^{\infty} \sum_{m=-l}^{l} P_{l,m}(f) j^l j_l(kr) y_l^m(\theta, \phi)$$

In that equation, the terms $P_{l,m}(f)$ are defined as the Fourier-Bessel coefficients of the field $p(r,\theta,\phi,t)$, $$k = \frac{2\pi f}{c},$$

c is the speed of sound in air (340 ms$^{-1}$), $j_l(kr)$ is the spherical Bessel function of the first kind and of order l defined by $$j_l(x) = \sqrt{\frac{\pi}{2x}} J_{l+1/2}(x)$$

where $J_v(x)$ is the Bessel function of the first kind and of order v, and $y_l^m(\theta,\phi)$ is the real spherical harmonic of order l and of term m, with m ranging from $-l$ to l, defined by:

$$y_l^m(\theta, \phi) = P_l^{|m|}(\cos\theta) trg_m(\phi)$$

with:

$$trg_m(\phi) = \begin{cases} \frac{1}{\sqrt{\pi}} \cos(m\phi) & \text{for } m > 0 \\ \frac{1}{\sqrt{2\pi}} & \text{for } m = 0 \\ \frac{1}{\sqrt{\pi}} \sin(m\phi) & \text{for } m < 0 \end{cases}$$

In that equation, the $P_l^m(x)$ are the associated Legendre functions defined by:

$$P_l^m(x) = \sqrt{\frac{2l+1}{2}} \sqrt{\frac{(l-m)!}{(l+m)!}} (1-x^2)^{m/2} \frac{d^m}{dx^m} P_l(x)$$

with $P_l(x)$ denoting the Legendre polynomials, defined by:

$$P_l(x) = \frac{1}{2^l l!} \frac{d^l}{dx^l} (x^2-1)^l.$$

The Fourier-Bessel coefficients are also expressed in the temporal domain by the coefficients $p_{l,m}(t)$ corresponding to the inverse temporal Fourier transform of the Fourier-Bessel coefficients $P_{l,m}(f)$.

In other embodiments, the sound field is decomposed on a function basis where each of the functions is expressed by an optionally infinite linear combination of Fourier-Bessel functions.

FIG. 2 shows a general flow chart of the method of the invention.

In general, the method starts with a step 2 of defining a processing operation to be applied to a representation of a sound field and corresponding to at least spatial processing of that sound field.

Step 2 of defining the processing operation comprises a step 4 of establishing a set of directivity functions which is representative of the processing operation.

A directivity function means a function, indicated $G(\theta,\phi,f)$, which associates a real or complex value, which is optionally a function of the frequency, or a range of frequencies, with each direction in space.

Any directivity function $G(\theta,\phi,f)$ is decomposed into spherical harmonic coefficients, indicated $G_{l,m}(f)$, by a spherical Fourier transform. Thus, the directivity function $G(\theta,\phi,f)$ is obtained from the spherical Fourier coefficients $G_{l,m}(f)$ by an inverse spherical Fourier transform, in accordance with the expression:

$$G(\theta, \phi, f) = \sum_{l=0}^{\infty} \sum_{m=-l}^{l} G_{l,m}(f) y_l^m(\theta, \phi)$$

In the rest of the document, the directivity functions may be denoted by their expression $G(\theta,\phi,f)$ in direct space or in the form of spherical Fourier coefficients $G_{l,m}(f)$.

This set of directivity functions is provided at the end of step 4 in the form of a set of coefficients corresponding to the decomposition of the directivity functions on a basis of spherical harmonics.

Subsequently, a step 6 of determining filtering combinations is carried out on the basis of the decomposition of the directivity functions which is carried out in step 4. The notion of filtering covers frequency, amplitude and phase filtering or a combination thereof.

Thus, step 6 of determining filtering combinations provides filtering combinations corresponding to the processing to be applied in the form of filter parameters later permitting the implementation of those filtering combinations with the aid, for example, of a set of digital filters.

With a view to applying the processing, the method comprises a step 8 of establishing an initial representation of the sound field in the form of a set of coefficients or signals which is representative of that field in time and in the three spatial dimensions.

In particular, this set of coefficients is a set of what are known as <<Fourier-Bessel>> coefficients as defined with reference to FIG. 1.

The method then comprises a step 10 of applying the filtering combinations, defined in the definition step 2, to the coefficients of the initial representation as defined in step 8.

Step 10 permits the production of a modified representation corresponding to a representation in time and in the three spatial dimensions of the initial sound field modified by the defined processing, in the form of a set of coefficients referred to as Fourier-Bessel coefficients.

FIG. 3 shows in detail the flow chart of a first embodiment of the invention.

In this embodiment, the processing operations applied are processing operations such as spatial windowing, which consists in modifying the gain of all or some of the virtual sources regarded as generating the initial sound field, and spatial convolution or spatial filtering, which consists in modifying the angular spread of all or some of those virtual sources, or any other analogous processing operation.

The windowing and convolution processing may vary with the frequency, which enables distance and spectrum modifications to be carried out on all or some of the virtual sources.

As described in FIG. 2, the method starts with a step 4 of determining a set of directivity functions which is representative of the processing to be applied.

In the case where the processing comprises only a single processing operation, such as windowing or convolution processing, a single directivity function, which optionally varies with the frequency, is sufficient to represent it.

Advantageously, the step 4 comprises a sub-step 12 for the direct determination of all or part of the set of directivity functions in one or other of a plurality of predetermined formats.

Additionally or alternatively, step 4 comprises a sub-step 14 for the input of a processing instruction which is interpreted automatically in an interpretation sub-step 16 permitting the automatic provision of all or part of the set of directivity functions in one or other of a plurality of predetermined formats. For example, the processing is used by software means in a computer and the processing instruction is in the form of an icon whose validation brings about the performance of a given processing operation by the software means.

The sub-steps 12 and 14 correspond, for example, to manual acquisition or also to the reception of directivity data coming from an internal memory or from an external device.

As a function of the format in which the set of directivity functions is determined, step 4 may require a sub-step 18 for the conversion of the set of directivity functions, from a predetermined format, into a set of coefficients corresponding to the decomposition of the directivity functions on a basis of spherical harmonics.

For each directivity function $G_{l,m}(f)$ of the set of directivity functions, this conversion sub-step 18 may be carried out in several ways.

For example, the directivity function $G_{l,m}(f)$ is defined on the basis of parameters $(r_q, \theta_q, \phi_q)$ specifying the position of Q virtual sources and parameters $H_q(f)$ specifying the frequency response of each of those sources. A radiation model is associated with each virtual source so that those sources as a whole are assumed to produce a sound field whose representation in Fourier-Bessel coefficients enables a directivity function to be associated with that field.

For example, the radiation model associated with each source is a spherical wave radiation model and the directivity function $G_{l,m}(f)$ is obtained in sub-step 18 by means of the following equations:

$$G_{l,m}(f) = \sum_{q=1}^{Q} \frac{H_q(f)}{r_q} e^{-\frac{j2\pi r_q f}{c}} \xi_l(r_q, f) y_l^m(\theta_q, \phi_q)$$

with $$\xi_l(r_q, f) = \sum_{k=0}^{l} \frac{(l+k)!}{2^k k!(l-k)!} \left(\frac{j2\pi r_q f}{c}\right)^{-k}$$

In a variant, this calculation is carried out on the basis of parameters $(\theta_q, \phi_q)$ specifying the directions of the Q sources. In that case, a plane wave radiation model is associated with each source and the directivity function $G_{l,m}(f)$ is obtained by means of the following equation:

$$G_{l,m}(f) = \sum_{q=1}^{Q} H_q(f) y_l^m(\theta_q, \phi_q)$$

In other embodiments, $G_{l,m}(f)$ is determined on the basis of a combination of plane wave and spherical wave radiation models.

In another case, the directivity function is defined on the basis of parameters representative of a parametric description of a directivity function. This description is effected in direct space and associates with each direction a value which may be complex. Advantageously, the parameters may vary with the frequency.

In that case, the coefficients of the directivity function $G_{l,m}(f)$ are determined by using a parametric model. The parameters of the model are placed in a vector $\vec{\gamma}(f)$ and the parametric model of the directivity function is written $G(\theta,\phi,\vec{\gamma}(f))$. The coefficients of the directivity function $G_{l,m}(f)$ are obtained by a spherical Fourier transform of $G(\theta,\phi,\vec{\gamma}(f))$ in accordance with the equation:

$$G_{l,m}(f) = \int_{\theta=0}^{\pi} \int_{\phi=0}^{2\pi} G(\theta, \phi, \vec{\gamma}(f)) y_l^m(\theta, \phi) \sin\theta \, d\theta \, d\phi$$

For example, the parametric model may correspond to a directivity function having a single lobe. This model is controlled by the parameters $(\theta_1(f), \phi_1(f))$ specifying the direction of the lobe and the parameter $\theta_0(f)$ specifying the opening angle of the lobe.

Thus, the parametric model may be a directivity function having the value 0 for any direction and having the value 1 for each direction $(\theta,\phi)$ verifying the following relationship:

$$(\theta_1(f),\phi_1(f)) \cdot (\theta,\phi) > \cos(\theta_0(f))$$

where $(\theta_1(f),\phi_1(f)) \cdot (\theta,\phi)$ denotes the scalar product between the directions $(\theta_1(f),\phi_1(f))$ and $(\theta,\phi)$.

In that case, the coefficients $G_{l,m}(f)$ of the directivity function are given by:

$$G_{l,m}(f) = 2\pi y_l^m(\theta_1(f), \phi(f)) \frac{P_{l-1}(\cos\theta_0(f)) - P_{l+1}(\cos\theta_0(f))}{2l+1}$$

In this expression $P_{-1}(x)=1$.

In a variant, the parameters of the parametric description of the directivity function may vary with time. In that case, the parameters of the model are placed in a vector $\vec{\gamma}(t)$ and the parametric model of the directivity function is written $g(\theta,\phi,\vec{\gamma}(t))$. The coefficients of the directivity function $g_{l,m}(t)$ expressed in the temporal domain are then obtained by a spherical Fourier transform of $g(\theta,\phi,\vec{\gamma}(t))$ in accordance with the expression:

$$g_{l,m}(t) = \int_{\theta=0}^{\pi} \int_{\phi=0}^{2\pi} g(\theta, \phi, \vec{\gamma}(t)) y_l^m(\theta, \phi) \sin\theta \, d\theta \, d\phi$$

The coefficients $G_{l,m}(f)$ of the directivity function which are expressed in the frequency domain are then obtained by a temporal Fourier transform of the coefficients $g_{l,m}(t)$.

In yet another case, the directivity function is defined in the form of a list of Q samples. The list is made up of Q pairs $\{((\theta_q,\phi_q), v_q)\}$ where $(\theta_q,\phi_q)$ is the direction of the sample q and where $v_q$ is the value of the directivity function in the direction $(\theta_q,\phi_q)$. Advantageously, the list of samples may be acquired for a plurality of frequencies f and is then indicated $\{((\theta_q,\phi_q), v_q)\}(f)$.

For each operating frequency f, the coefficients $G_{l,m}(f)$ of the directivity function are derived from the list of samples $\{((\theta_q,\phi_q), v_q)\}(f)$. These coefficients are obtained by inverting the angular sampling process which permits the derivation of the samples from the list $\{((\theta_q,\phi_q), v_q)\}(f)$ on the basis of a directivity function supplied in the form of spherical harmonic coefficients. This inversion may assume various forms in order to control the interpolation between the samples.

In the embodiment described, the samples are placed in a vector V in the following manner.

$$[v_1 \, v_2 \ldots v_q]^t$$

A matrix Y is constituted from the sampling directions in the following manner:

$$\begin{bmatrix} Y_{1,0,0} & Y_{1,1,-1} & Y_{1,1,0} & Y_{1,1,1} & \cdots & Y_{1,L,-L} & \cdots & Y_{1,L,0} & \cdots & Y_{1,L,L} \\ Y_{2,0,0} & Y_{2,1,-1} & Y_{2,1,0} & Y_{2,1,1} & \cdots & Y_{2,L,-L} & \cdots & Y_{2,L,0} & \cdots & Y_{2,L,L} \\ \vdots & \vdots & \vdots & \vdots & \vdots & \vdots & & \vdots \\ Y_{Q,0,0} & Y_{Q,1,-1} & Y_{Q,1,0} & Y_{Q,1,1} & \cdots & Y_{Q,L,-L} & \cdots & Y_{Q,L,0} & \cdots & Y_{Q,L,L} \end{bmatrix}$$

where each element $Y_{q,l,m}$ is equal to:

$$Y_{q,l,m} = y_l^m(\theta_q,\phi_q)$$

It will be remembered that $y_l^m(\theta_q,\phi_q)$ denotes the spherical harmonic of order l and of term m for the sampling direction $\theta_q,\phi_q$ considered.

A vector G containing the coefficients $G_{l,m}(f)$ is determined for the frequency f. The vector G may be determined by means of the following relationships:

if the number Q of samples at frequency f is greater than the number of coefficients $G_{l,m}(f)$:

$$G = (Y^T Y)^{-1} Y^T V;$$

and if the number Q of samples at frequency f is less than the number of coefficients $G_{l,m}(f)$:

$$G = Y^T (Y Y^T)^{-1} V.$$

In the vector G, the coefficients $G_{l,m}(f)$ are organized in the following manner:

$$[G_{0,0}(f) \, G_{1,-1}(f) \, G_{1,0}(f) \, G_{1,1}(f) \ldots G_{L,-L}(f) \ldots G_{L,0}(f) \ldots G_{L,L}(f)]^t$$

In a variant, the list of samples may be acquired for a plurality of instants t and is then indicated $\{((\theta_q,\phi_q), v_q)\}(t)$.

For each instant t acquired, the directivity function coefficients $g_{l,m}(t)$ expressed in the temporal domain are derived from the list of samples $\{((\theta_q,\phi_q), v_q)\}(t)$. These coefficients are obtained by inverting the angular sampling process which permits derivation of the samples from the list $\{((\theta_q,\phi_q) \, v_q)\}(t)$ on the basis of a directivity function supplied in the form of spherical harmonic coefficients.

The directivity function coefficients $G_{l,m}(f)$ expressed in the frequency domain are then obtained by a temporal Fourier transform of the coefficients $g_{l,m}(t)$.

Of course, in the case where step 12 or 16 provides the directivity function directly in the form of coefficients corresponding to the decomposition of that function on a basis of spherical harmonics, the conversion sub-step 18 does not modify the function.

Thus, at the end of step 4, a set of directivity functions which is representative of the processing to be applied is provided in the form of a set of coefficients corresponding to the decomposition of those functions on a basis of spherical harmonics.

In addition, step 2 of defining the processing operation also comprises a step 20 of establishing a set of processing parameters.

As in the case of step 4, this set of parameters may be determined directly during a sub-step 22 for direct determination and/or after a sub-step 24 for the input of a processing instruction and a sub-step 26 for the interpretation of that processing instruction permitting the automatic provision of all or part of the set of parameters.

The sub-steps 22 and 24 correspond, for example, to manual acquisition of specific parameters or also to the reception of parameter data from an internal memory or an external device.

In particular, during step 20 of establishing a set of parameters, all or some of the following parameters are defined:
- a parameter L specifying the limit order of operation of the method and corresponding to the desired mathematical precision limit; and
- a set of constants indicated $c_{l,m,l'',m''}^{l',m'}$ forming weighting coefficients defined as a function of the nature of the processing operation. In particular, these coefficients are advantageously applied to the directivity functions in order to obtain the above-mentioned filtering combinations.

Some parameters may be invariant and may be directly integrated in the method.

The parameter L enables the method to be adapted to the level of precision of the initial representation and, in particular, enables the method to which the invention relates to apply a processing operation to an initial representation having a high level of precision.

As has been described above, the constants $c_{l,m,l'',m''}^{l',m'}$ may be determined directly during step 20 by an operator, from a memory or a device arranged internally. For example, they are all calculated beforehand, stored in a memory and selected as a function of the nature of the processing operation.

Alternatively, an instruction defining the nature of the processing operation is acquired during sub-step 24, and sub-step 26 corresponds to the calculation of all or part of this set of constants as a function of the nature of the processing operation and from relationships described later in the text.

Of course, the constants $c_{l,m,l'',m''}^{l',m'}$ can be determined using a combination of the described solutions.

The parameters established during step 20, and also the coefficients corresponding to the directivity functions established during step 4, are used during step 6 of determining the filtering combinations.

This determination step 6 comprises a sub-step 30 of calculating filtering combinations by linear combinations of the coefficients corresponding to the spherical harmonic-based decomposition of the set of directivity functions which is representative of the processing operation.

During this first calculation sub-step 30, filtering combinations indicated $C_{l,m}^{l',m'}(f)$ are determined on the basis of the directivity functions $G_{l,m}(f)$ and the constants $c_{l,m,l'',m''}^{l',m'}$ which are determined as a function of the nature of the processing operation and which form weighting coefficients of the linear combinations. The filtering combinations are then determined in the following manner:

$$C_{l,m}^{l',m'}(f) = \sum_{l''=0}^{L} \sum_{m''=-l''}^{l''} c_{l,m,l'',m''}^{l',m'} G_{l'',m''}(f)$$

In the above relationship, l and m denote the order and the term, respectively, of the coefficients of the initial representation, l', m' denote the order and the term of the coefficients of the modified representation and l'', m'' denote the order and the term of the coefficients of the directivity function.

In the case where the processing operation is a processing operation of the windowing type, the constants $c_{l,m,l'',m''}^{l',m'}$ are determined by the relationships:

$$c_{l,m,l'',m''}^{l',m'} = \begin{cases} \frac{1}{\sqrt{2}}\left(c_{l,m,l'',m''}^{l',m'(1)} + c_{l,-m,l'',m''}^{l',m'(1)}\right) & \text{for } m > 0 \\ c_{l,0,l'',m''}^{l',m'(1)} & \text{for } m = 0 \\ \frac{j}{\sqrt{2}}\left(c_{l,-m,l'',m''}^{l',m'(1)} - c_{l,m,l'',m''}^{l',m'(1)}\right) & \text{for } m < 0 \end{cases}$$

with $$c_{l,m,l'',m''}^{l',m'(1)} = \begin{cases} \frac{1}{\sqrt{2}}\left(c_{l,m,l'',m''}^{l',m'(2)} + c_{l,m,l'',-m''}^{l',m'(2)}\right) & \text{for } m'' > 0 \\ c_{l,m,l'',0}^{l',m'(2)} & \text{for } m'' = 0 \\ \frac{j}{\sqrt{2}}\left(c_{l,m,l'',-m''}^{l',m'(2)} - c_{l,m,l'',m''}^{l',m'(2)}\right) & \text{for } m'' < 0 \end{cases}$$

with $$c_{l,m,l'',m''}^{l',m'(2)} = \begin{cases} \frac{1}{\sqrt{2}}\left(c_{l,m,l'',m''}^{l',m'(3)} + c_{l,m,l'',m''}^{l',-m'(3)}\right) & \text{for } m' > 0 \\ c_{l,m,l'',m''}^{l',0(3)} & \text{for } m' = 0 \\ \frac{1}{j\sqrt{2}}\left(c_{l,m,l'',m''}^{l',-m'(3)} - c_{l,m,l'',m''}^{l',m'(3)}\right) & \text{for } m' < 0 \end{cases}$$

with $$c_{l,m,l'',m''}^{l',m'(3)} = \delta_{m''}^{m'-m} \frac{1}{2\sqrt{\pi}} \frac{\sqrt{(2l+1)(2l'+1)(2l''+1)}}{l+l'+l''+1}$$

$$\sqrt{\frac{C_{l+|m|}^{l} C_{l'+|m'|}^{l'} C_{l''+|m''|}^{l''}}{C_{l}^{|m|} C_{l'}^{|m'|} C_{l''}^{|m''|}}} \times \sum_{k=|m|}^{l} \sum_{k'=|m'|}^{l'} \sum_{k''=|m''|}^{l''} (-1)^{k+k'+k''}$$

$$\frac{C_{l}^{k} C_{l}^{k-|m|} C_{l'}^{k'} C_{l'}^{k'-|m'|} C_{l''}^{k''} C_{l''}^{k''-|m''|}}{C_{l+l'+l''}^{k+k'+k''-n}}$$

and $$\delta_x^y = \begin{cases} 1 & \text{for } x = y \\ 0 & \text{for } x \neq y \end{cases}$$

and $$n = \frac{|m|+|m'|+|m''|}{2} \text{ and } C_n^p = \frac{n!}{p!(n-p)!}$$

This processing operation corresponds to the application of spatial windowing with temporal filtering since the spherical harmonic coefficients $G_{l,m}(f)$ correspond to the directivity function $G(\theta,\phi,f)$. Likewise, the Fourier-Bessel coefficients $P^{(I)}_{l,m}(f)$ of the initial sound field correspond to spherical harmonic coefficients of a directivity function $P^{(I)}(\theta,\phi,f)$. Thus, the spatial windowing with temporal filtering results, for each frequency f, in a windowing of the directivity function $P^{(I)}(\theta,\phi,f)$ by the directivity function $G(\theta,\phi,f)$, which corresponds to a multiplication for each direction $(\theta,\phi)$ of the value of those two directivity functions, it being possible for the values of the two directivity functions to be complex.

As described above, this processing applied to the sound field has the effect of modifying the amplitude, the distance and the spectrum of all or part of the set of virtual sources regarded as generating the sound field.

The directivity function $G(\theta,\phi,f)$ may be independent of the frequency and is then indicated $G(\theta,\phi)$. The processing is then solely spatial and corresponds, for each frequency f, to the multiplication of the directivity function $P^{(I)}(\theta,\phi,f)$ by the directivity function $G(\theta,\phi)$.

In the case where the processing operation is of the convolution type, the constants $c_{l,m,l'',m''}^{l',m'}$ are determined by the relationship:

$$c_{l,m,l'',m''}^{l',m'} = \begin{cases} \frac{1}{\sqrt{2}}\left(c_{l,m,l'',m''}^{l',m'(1)} + c_{l,-m,l'',m''}^{l',m'(1)}\right) & \text{for } m > 0 \\ c_{l,0,l'',m''}^{l',m'(1)} & \text{for } m = 0 \\ \frac{j}{\sqrt{2}}\left(c_{l,-m,l'',m''}^{l',m'(1)} - c_{l,m,l'',m''}^{l',m'(1)}\right) & \text{for } m < 0 \end{cases}$$

with $$c_{l,m,l'',m''}^{l',m'(1)} = \begin{cases} \frac{1}{\sqrt{2}}\left(c_{l,m,l'',m''}^{l',m'(2)} + c_{l,m,l'',-m''}^{l',m'(2)}\right) & \text{for } m'' > 0 \\ c_{l,m,l'',0}^{l',m'(2)} & \text{for } m'' = 0 \\ \frac{j}{\sqrt{2}}\left(c_{l,m,l'',-m''}^{l',m'(2)} - c_{l,m,l'',m''}^{l',m'(2)}\right) & \text{for } m'' < 0 \end{cases}$$

with $$c_{l,m,l'',m''}^{l',m'(2)} = \begin{cases} \frac{1}{\sqrt{2}}\left(c_{l,m,l'',m''}^{l',m'(3)} + c_{l,m,l'',m''}^{l',-m'(3)}\right) & \text{for } m' > 0 \\ c_{l,0,l'',m''}^{l',0(3)} & \text{for } m' = 0 \\ \frac{1}{j\sqrt{2}}\left(c_{l,m,l'',m''}^{l',-m'(3)} - c_{l,m,l'',m''}^{l',m'(3)}\right) & \text{for } m' < 0 \end{cases}$$

with $$c_{l,m,l'',m''}^{l',m'(3)} = \delta_{l''}^{l'} \delta_{m''}^{m'-m} 2\sqrt{\pi}\, \varepsilon_{m'}^{m'} \varepsilon_{m''}^{m''} \frac{\sqrt{2l+1}}{l+l'+l''} \sqrt{\frac{C_{l+|m|}^{l} C_{l'+|m'|}^{l'} C_{l''}^{|m''|}}{C_{l}^{|m|} C_{l'}^{|m'|} C_{l''+|m''|}^{l''}}}$$

$$\sum_{k=|m|}^{l} C_l^k C_l^{k-|m|} \times \sum_{p=\max(0,-m)}^{\min(l'-m',l'+m'')} (-1)^{p+k+m}$$

$$C_{l'+m'}^{p} C_{l'-m''}^{p+m} \times \begin{cases} 1/C_{l'+l}^{p+k} & \text{if } m \geq 0 \\ 1/C_{l'+l}^{p+k+m} & \text{if } m \leq 0 \end{cases}$$

and $$\varepsilon_m^m = (\text{sign}(m))^m$$

This processing operation corresponds to the application of spatial filtering with temporal filtering.

For the spherical harmonic coefficients $G_{l,m}(f)$ correspond to Fourier-Bessel coefficients of a sound field produced by a linear and angularly invariant sound system, in response to excitation by a reference sound field, such as a plane impulse wave coming from the direction (0,0). Such a response is denoted by the expression <<spatio-temporal response>>. A linear sound system is angularly invariant when a rotation of the field which it receives induces the same rotation on the field which it generates. Thus, the coefficients $G_{l,m}(f)$ correspond to the spatio-temporal response of such a sound system.

The Fourier-Bessel coefficients $P^{(I)}_{l,m}(f)$ of the initial sound field are also regarded as spherical harmonic coefficients of a directivity function $P^{(I)}(\theta,\phi,f)$. Thus, the spatial convolution with temporal filtering results, for each frequency f, in a spatial convolution of the directivity function $P^{(I)}(\theta,\phi,f)$ by the directivity function $G(\theta,\phi,f)$, which is regarded at each frequency f as a directional convolution kernel.

In the embodiment described, the convolution is applied taking a direction $(\theta_0,\phi_0)$ into account, the convolution kernel $G(\theta,\phi,f)$ is then turned, bringing its north pole (vertical direction with $\theta=0$ and $\phi=0$) to $(\theta_0,\phi_0)$. In order to obtain the value of the modified sound field $\tilde{P}^{(I)}(\theta,\phi,f)$ in the direction $(\theta',\phi')$, the value in the direction $(\theta',\phi')$ of the turned kernel is multiplied by the value of $P^{(I)}(\theta,\phi,f)$ in the direction $(\theta_0,\phi_0)$ and those products are added together for all of the directions $(\theta_0,\phi_0)$.

This processing applied to the sound field permits, for example, modification of the angular spread, i.e., the spatial localization precision, that is to say, the size of the virtual point sources regarded as generating the initial sound field, for each frequency f. This processing is the spatial analogue of temporal convolution by a window, the effect of which is to modify the temporal spread of a sound event, such as, for example, an averaging or delay effect.

In the case where the directivity function $G_{l,m}(f)$ has cylindrical symmetry, that is to say, if $G_{l,m}(f)=0$ for $m \neq 0$, the above equations are simplified, and the coefficients $c_{l,m,l'',m''}^{l',m'}$ are then determined by the relationship:

$$c_{l,m,l'',m''}^{l',m'} = \delta_{l''}^{l'} \delta_{l'}^{l} \delta_{m'}^{m} \delta_{m''}^{0} \sqrt{\frac{4\pi}{2l+1}}$$

The directivity function $G(\theta,\phi,f)$ may be independent of the frequency and is then indicated $G(\theta,\phi)$. The processing is then solely spatial and corresponds, for each frequency f, to the convolution of the directivity function $P^{(I)}(\theta,\phi,f)$ associated with the initial field by the directivity function $G(\theta,\phi)$.

In addition, the method of the invention also enables rotation processing to be carried out. In that case, however, use is not made of directivity functions and the method requires parameters $(\theta,\phi,\psi)$ representative of a rotation of the sound field about the origin O.

Thus, if the processing operation is a rotation, the filtering combinations are determined from the parameters $(\theta,\phi,\psi)$ representative of the rotation of the sound field according to the relationship:

$$C_{l,m}^{l',m'} = \delta_l^{l'} D_{m',m}^{lR} \text{ with}$$

$$D_{m',m}^{lR} = \begin{cases} \Re(D_{m',m}^l + D_{-m',m}^l) & \text{for } m' > 0 \text{ and } m > 0 \\ \sqrt{2}\,\Re(D_{m',0}^l) & \text{for } m' > 0 \text{ and } m = 0 \\ \Im(D_{m',m}^l + D_{-m',m}^l) & \text{for } m' > 0 \text{ and } m < 0 \\ \sqrt{2}\,\Re(D_{0,m}^l) & \text{for } m' = 0 \text{ and } m > 0 \\ D_{0,0}^l & \text{for } m' = 0 \text{ and } m = 0 \\ \sqrt{2}\,\Im(D_{0,m}^l) & \text{for } m' = 0 \text{ and } m < 0 \\ \Im(D_{-m',m}^l - D_{m',m}^l) & \text{for } m' < 0 \text{ and } m > 0 \\ -\sqrt{2}\,\Im(D_{m',0}^l) & \text{for } m' < 0 \text{ and } m = 0 \\ \Re(D_{m',m}^l - D_{-m',m}^l) & \text{for } m' < 0 \text{ and } m < 0 \end{cases}$$

with $D_{m',m}^l = \varepsilon_m^m \varepsilon_{m'}^{m'} d_{m',m}^l(\theta) e^{-jm'\phi} e^{-jm\psi}$ with -continued $$d_{m',m}^l(\theta) = \sqrt{\frac{(l+m')!(l-m')!}{(l+m)!(l-m)!}} \sum_{k=\max(0,m-m')}^{\min(l-m',l+m)} (-1)^k$$

$$C_{l+m}^k C_{l-m}^{k+m'-m} \times \left(\cos\frac{\theta}{2}\right)^{2l+m-m'-2k} \left(\sin\frac{\theta}{2}\right)^{2k+m'-m}$$

and $\mathcal{R}(x)$ = real part $(x)$ and $\mathcal{I}(x)$ = imaginary part $(x)$ In this relationship, the convention used for the angles θ, φ and ψ, consists in effecting a rotation through an angle ψ about the axis (OZ) then through an angle θ about the axis (OY) then through an angle φ about the axis (OZ).

Finally, the processing carried out may also correspond to neutral processing. In that case, the filtering combinations are all zero except for the values where l'=l and m'=m where they equal 1.

Of course, other processing operations as well as combinations of the processing operations described can be carried out thanks to the definition of the set of weighting constants $c_{l,m,l'',m''}^{l',m'}$.

For example, random processing may be carried out by the random definition of the set of constants.

Advantageously, the calculation sub-step 30 is carried out solely for the non-zero constants $c_{l,m,l'',m''}^{l',m'}$.

The filtering combinations $C_{l,m}^{l',m'}(f)$ so obtained are placed in a matrix C of size $(L'+1)^2$ by $(L+1)^2$.

In the case where the processing operation to be applied consists solely of rotation, convolution or filtering, the matrix C corresponds directly to the filtering combinations to be applied and is indicated in a general manner F so that the results of the calculation sub-step 30 form the filtering combinations that are to be applied to the coefficients of the initial representation.

In the case where the processing operation corresponds to a combination of processing operations, such as rotations, filtering operations, convolutions and/or any kind of processing, the sub-step 30 is repeated a plurality of times and each matrix C is memorized in succession in order to be combined with the following matrices, finally to provide a matrix F comprising the coefficients corresponding to the filtering combinations that are to be applied to the coefficients of the initial representation. Thus, the matrix F is obtained by matrix multiplication of the successive matrices C.

Each element $F_{l,m}^{l',m'}(f)$ of the matrix F represents the frequency response of a spatio-temporal processing filter.

Various forms of filters and filtering methods may be used in step 10 of applying the filtering combinations to the initial representation of the sound field.

In the case where the filters are parameterized directly with frequency responses, the coefficients $F_{l,m}^{l',m'}(f)$ are applied directly. Advantageously, step 6 of determining the filtering combinations comprises a conversion sub-step 32 in order to determine the parameters of the filters for other filtering methods.

For example, the filtering combinations $F_{l,m}^{l',m'}(f)$ are converted into:

finite impulse responses $f_{l,m}^{l',m'}(t)$ calculated by inverse temporal Fourier transform of $F_{l,m}^{l',m'}(f)$, each impulse response $f_{l,m}^{l',m'}(f)$ is sampled and then truncated to a length suitable for each response; or coefficients of recursive filters having infinite impulse responses calculated from the $F_{l,m}^{l',m'}(f)$ with adaptation methods.

The filtering combinations so defined are applied during step 10 of applying the filtering combinations, which transforms the initial representation $P^{(I)}_{l,m}(f)$ into a modified representation which is indicated $P^{(T)}_{l,m}(f)$ and which corresponds to a modified sound field, by applying thereto the processing filters representative of the at least spatial processing defined in step 2.

During step 10, coefficients $p^{(T)}_{l,m}(t)$ corresponding to the coefficients of the modified representation $P^{(T)}$ are derived from the coefficients $p^{(I)}_{l,m}(t)$ corresponding to the coefficients of the initial representation $P^{(I)}$, by the application of the frequency response processing filters $F_{l,m}^{l',m'}(f)$ in the following manner:

$$P^{(T)}_{l',m'}(f) = \sum_{l=0}^{L} \sum_{m=-l}^{l} F_{l,m}^{l',m'}(f) P^{(I)}_{l,m}(f)$$

where $P^{(I)}_{l,m}(f)$ is the Fourier transform of $p^{(I)}_{l,m}(t)$ and where $P^{(T)}_{l,m}(f)$ is the Fourier transform of $p^{(T)}_{l,m}(t)$, these being coefficients relating to the initial representation and the modified representation, respectively.

Thus, step 10 implements the conventional temporal filtering methods for the application of the filtering combinations provided by step 2 in a suitable form.

For example:

the filtering may be effected by means of filtering methods in the frequency domain, such as, for example, block convolution techniques. In that case, the filtering combinations are supplied in the form of the frequency responses $F_{l,m}^{l',m'}(f)$.

the filtering may be effected in the temporal domain by temporal convolution. In that case, the filtering combinations are supplied in the form of the impulse responses $f_{l,m}^{l',m'}(t)$.

the filtering may be effected in the temporal domain by means of infinite impulse response recursive filters. In that case, the filtering combinations are supplied in the form of the recurrence relation coefficients.

Figure 4:
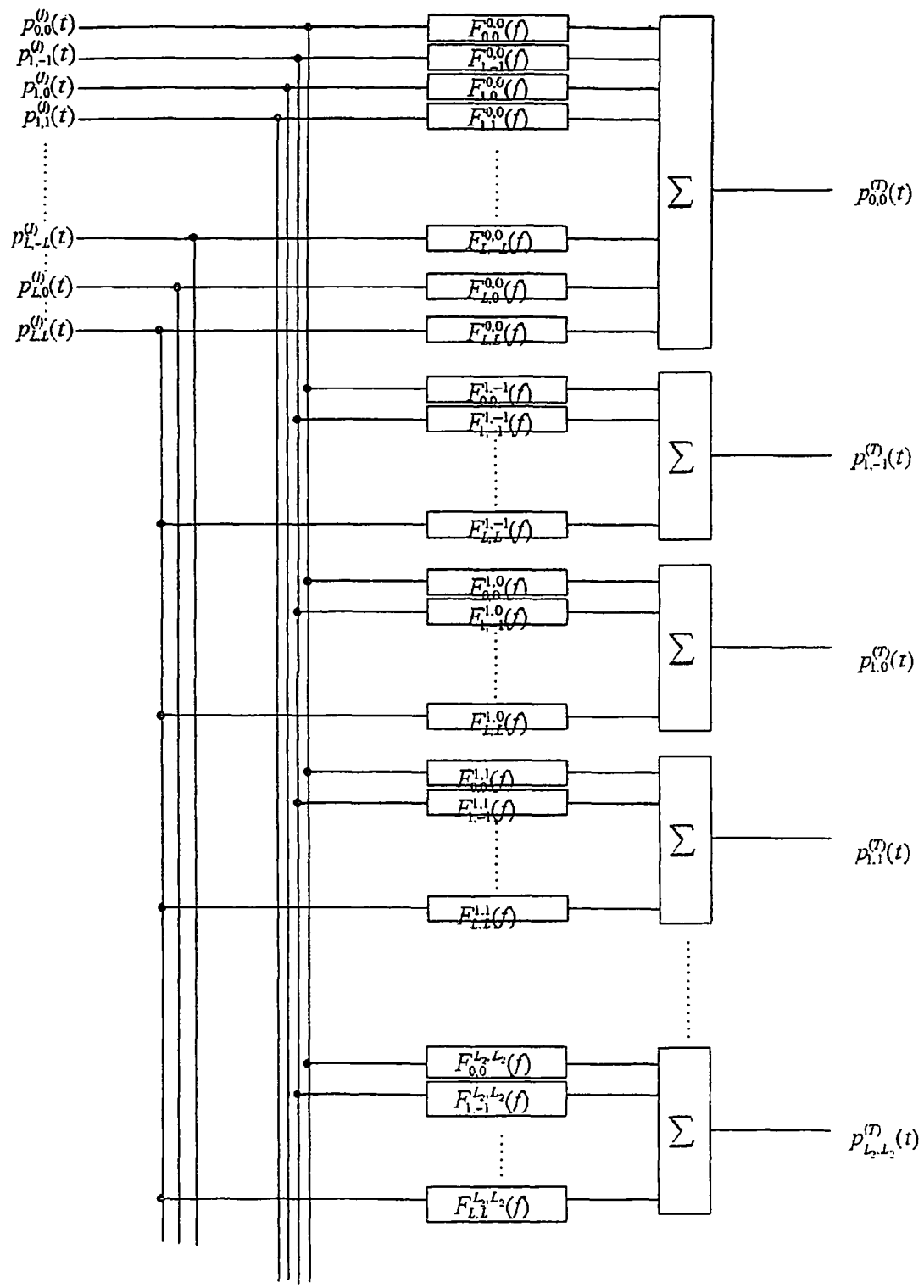
FIG. 4 is a diagram of an embodiment of the step of applying the processing.

FIG. 4 describes the case of finite impulse response filtering. This filtering initially requires the determination of a variable $T_{l,m}^{l',m'}$ corresponding to the number of samples characteristic of each response $f_{l,m}^{l',m'}(t)$, which leads to the following temporal convolution expression:

$$p^{(T)}_{l',m'}(t) = \sum_{l=0}^{L} \sum_{m=-l}^{l} \sum_{\tau=0}^{T_{l,m}^{l',m'}-1} f_{l,m}^{l',m'}[\tau] p^{(I)}_{l,m}[t-\tau]$$

These coefficients $p^{(T)}_{l,m}(t)$ are representative of a sound field corresponding to the initial sound field after the application of the at least spatial processing which associates with a sound field produced by at least one source, another sound field produced by at least one source whose direction, distance and/or gain are thus modified.

In another embodiment, the method of the invention also permits the application of distortion-type processing operations corresponding to a distortion of portions of the sound field by modifications to the characteristics of spread, position, amplitude of all or some of the virtual sources generating the initial sound field.

This distortion processing may vary with the frequency, which enables distance and spectrum modifications to be carried out on all or some of these virtual sources.

Advantageously, this processing may be combined with one of the processing operations as described with reference to FIG. 3.

Figure 5:
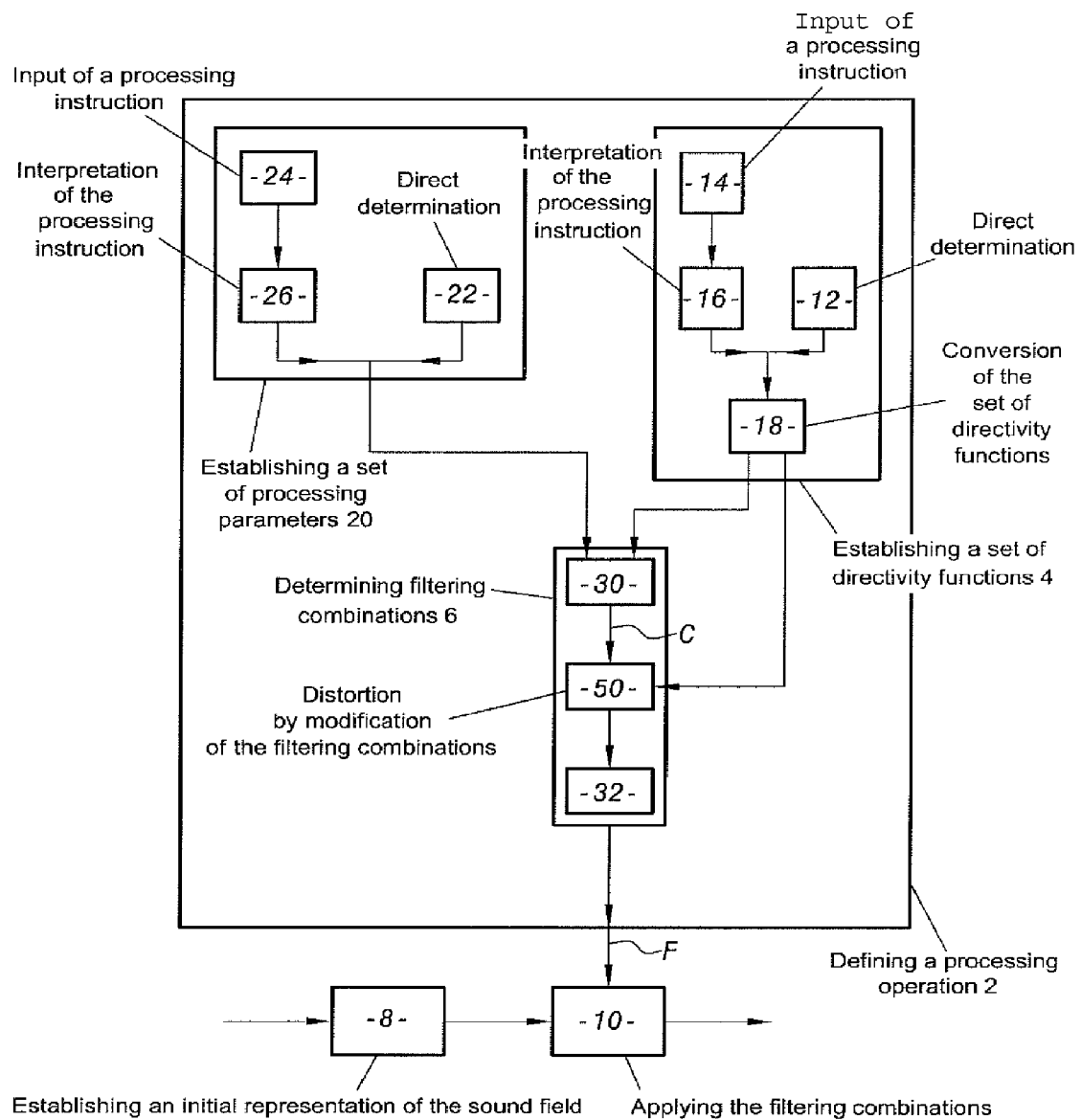
FIG. 5 is a detailed flow chart of a second embodiment of the invention.

FIG. 5 describes the flow chart of the method of the invention in such an embodiment combining a first processing operation, called nominal processing and corresponding to a processing operation as described above, with a spatial distortion processing operation which results in distortions of frequency, amplitude and/or phase characteristics of components of the representation of the initial sound field.

Thus, in this embodiment, step 2 of defining the processing comprises, as before, the step 4 of establishing a set of directivity functions comprising the sub-step 12 of direct determination and/or the sub-steps 14 of acquisition and 16 of interpretation as well as the conversion sub-step 18 enabling a set of directivity functions to be provided in the form of a set of coefficients corresponding to the decomposition of those functions on a basis of spherical harmonics.

In this embodiment, part of the set of directivity functions determined in step 4 corresponds to N distortion pairs representative of a distortion to be applied. In a manner similar to the embodiment described above, these distortion pairs are described in the form of a set of coefficients, indicated $\{(H_{l,m,n}(f), H'_{l,m,n}(f))\}$, corresponding to their decomposition on a basis of spherical harmonics.

Each distortion pair is constituted by two directivity functions which correspond to the Fourier-Bessel coefficients of a source sound field and a target sound field, the distortion operation applied to the source sound field tending to cause it to resemble the target sound field.

Thus, step 4 provides a set of directivity functions corresponding to the nominal processing and also to distortion pairs representative of the distortion to be applied in the form of a set of coefficients corresponding to the decomposition of the directivity functions on a basis of spherical harmonics.

As above, step 2 also comprises the step 20 of determining the set of processing parameters by means of the direct determination sub-step 22 and/or the sub-steps 24 of acquisition and 26 of interpretation.

However, in this embodiment, the step 20 of determining parameters also permits the determination of a parameter $\lambda$ which may be adjusted between 0 and 1 and which specifies the resemblance between the final processing to be applied and the nominal processing determined by step 4, that is to say, the relative magnitude of the distortion to be effected.

Thus, if $\lambda$ is equal to 1, only the distortion is taken into account and if $\lambda$ is equal to 0, only the processing determined during step 4 is taken into account.

As in the embodiment described with reference to FIG. 3, step 6 of determining the filtering combinations comprises the calculation sub-step 30 carried out as described above and permitting the provision of a matrix C comprising a set of filtering combinations corresponding to the application of the nominal processing as defined by the set of directivity functions that is determined in step 4.

The set of distortion pairs is used in step 6 of determining the filtering combinations during a sub-step 50 of distortion by modification of the filtering combinations determined at the end of the calculation sub-step 30.

During this sub-step 50, the filtering combinations $C_{l,m}^{l',m'}(f)$ are modified on the basis of the distortion pairs indicated $\{(H_{l,m,n}(f), H'_{l,m,n}(f))\}$ and the parameter $\lambda$ in order to supply as an output the filtering combinations $F_{l,m}^{l',m'}(f)$ which are representative of the processing including the nominal processing and the distortion and which are to be applied to the coefficients of the initial representation.

During sub-step 50, the spherical harmonic coefficients $H_{l,m,n}(f)$ representative of the N source directivity functions are placed in a matrix H of size $(L+1)^2$ by N in the following manner:

$$\begin{bmatrix} H_{0,0,1}(f) & H_{0,0,2}(f) & \cdots & H_{0,0,N}(f) \\ H_{1,-1,1}(f) & H_{1,-1,2}(f) & \cdots & H_{1,-1,N}(f) \\ H_{1,0,1}(f) & H_{1,0,2}(f) & \cdots & H_{1,0,N}(f) \\ H_{1,1,1}(f) & H_{1,1,2}(f) & \cdots & H_{1,1,N}(f) \\ \vdots & \vdots & & \vdots \\ H_{L,-L,1}(f) & H_{L,-L,2}(f) & \cdots & H_{L,-L,N}(f) \\ \vdots & \vdots & & \vdots \\ H_{L,0,1}(f) & H_{L,0,2}(f) & \cdots & H_{L,0,N}(f) \\ \vdots & \vdots & & \vdots \\ H_{L,L,1}(f) & H_{L,L,2}(f) & \cdots & H_{L,L,N}(f) \end{bmatrix}$$

Likewise, the spherical harmonic coefficients $H'_{l,m,n}(f)$ representative of the N target directivity functions are placed in a matrix H' of size $(L'+1)^2$ by N :

$$\begin{bmatrix} H'_{0,0,1}(f) & H'_{0,0,2}(f) & \cdots & H'_{0,0,N}(f) \\ H'_{1,-1,1}(f) & H'_{1,-1,2}(f) & \cdots & H'_{1,-1,N}(f) \\ H'_{1,0,1}(f) & H'_{1,0,2}(f) & \cdots & H'_{1,0,N}(f) \\ H'_{1,1,1}(f) & H'_{1,1,2}(f) & \cdots & H'_{1,1,N}(f) \\ \vdots & \vdots & & \vdots \\ H'_{L',-L',1}(f) & H'_{L',-L',2}(f) & \cdots & H'_{L',-L',N}(f) \\ \vdots & \vdots & & \vdots \\ H'_{L',0,1}(f) & H'_{L',0,2}(f) & \cdots & H'_{L',0,N}(f) \\ \vdots & \vdots & & \vdots \\ H'_{L',L',1}(f) & H'_{L',L',2}(f) & \cdots & H'_{L',L',N}(f) \end{bmatrix}$$

The coefficients $C_{l,m}^{l',m'}(f)$ of the filtering combinations of the nominal processing are also placed in a matrix C of size $(L'+1)^2$ by $(L+1)^2$:

$$\begin{bmatrix} C_{0,0}^{0,0}(f) & C_{1,-1}^{0,0}(f) & C_{1,0}^{0,0}(f) & C_{1,1}^{0,0}(f) & \cdots & C_{L,-L}^{0,0}(f) & \cdots & C_{L,0}^{0,0}(f) & \cdots & C_{L,L}^{0,0}(f) \\ C_{0,0}^{1,-1}(f) & C_{1,-1}^{1,-1}(f) & C_{1,0}^{1,-1}(f) & C_{1,1}^{1,-1}(f) & \cdots & C_{L,-L}^{1,-1}(f) & \cdots & C_{L,0}^{1,-1}(f) & \cdots & C_{L,L}^{1,-1}(f) \\ C_{0,0}^{1,0}(f) & C_{1,-1}^{1,0}(f) & C_{1,0}^{1,0}(f) & C_{1,1}^{1,0}(f) & \cdots & C_{L,-L}^{1,0}(f) & \cdots & C_{L,0}^{1,0}(f) & \cdots & C_{L,L}^{1,0}(f) \\ C_{0,0}^{1,1}(f) & C_{1,-1}^{1,1}(f) & C_{1,0}^{1,1}(f) & C_{1,1}^{1,1}(f) & \cdots & C_{L,-L}^{1,1}(f) & \cdots & C_{L,0}^{1,1}(f) & \cdots & C_{L,L}^{1,1}(f) \\ \vdots & \vdots & \vdots & \vdots & & \vdots & & \vdots & & \vdots \\ C_{0,0}^{L',-L'}(f) & C_{1,-1}^{L',-L'}(f) & C_{1,0}^{L',-L'}(f) & C_{1,1}^{L',-L'}(f) & \cdots & C_{L,-L}^{L',-L'}(f) & \cdots & C_{L,0}^{L',-L'}(f) & \cdots & C_{L,L}^{L',-L'}(f) \\ \vdots & \vdots & \vdots & \vdots & & \vdots & & \vdots & & \vdots \\ C_{0,0}^{L',0}(f) & C_{1,-1}^{L',0}(f) & C_{1,0}^{L',0}(f) & C_{1,1}^{L',0}(f) & \cdots & C_{L,-L}^{L',0}(f) & \cdots & C_{L,0}^{L',0}(f) & \cdots & C_{L,L}^{L',0}(f) \\ \vdots & \vdots & \vdots & \vdots & & \vdots & & \vdots & & \vdots \\ C_{0,0}^{L',L'}(f) & C_{1,-1}^{L',L'}(f) & C_{1,0}^{L',L'}(f) & C_{1,1}^{L',L'}(f) & \cdots & C_{L,-L}^{L',L'}(f) & \cdots & C_{L,0}^{L',L'}(f) & \cdots & C_{L,L}^{L',L'}(f) \end{bmatrix}$$

The filtering combinations $F_{l,m}^{l',m'}(f)$ representative of the processing operation in its entirety are then determined in the course of the distortion sub-step 50 corresponding to an optimization which determines a set of filtering combinations verifying in the best possible manner the distortion pairs and the resemblance between $F_{l,m}^{l',m'}(f)$ and $C_{l,m}^{l',m'}(f)$.

This optimization can be effected by means of methods such as gradient descent or matrix inversion methods and also permits the determination, on the virtual sources regarded as generating the initial sound field, of modifications that are not directly specified by the distortion pairs.

For example, the modifications defined by the distortion pairs are interpolated on the portions adjacent to the directly targeted portions in order to obtain the filtering combinations, which results in progressive modifications to the initial representation of the sound field around the portions directly targeted by the distortion pairs.

The embodiment described uses a matrix inversion method which leads to the determination of a matrix F during sub-step 50 according to the relationship:

$$F=((1-\lambda)C+\lambda H'H^T)((1-\lambda)I+\lambda H H^T)^{-1}$$

where I denotes the identity matrix of size $(L+1)^2$.

In the case where $\lambda$ equals 1 and where $N \leq (L+1)^2$, the matrix F is given by:

$$F=C+(H'-CH)(H^T H)^{-1} H^T$$

In the matrix F, the coefficients $F_{l,m}^{l',m'}(f)$ are organized in the following manner:

$$\begin{bmatrix}
F_{0,0}^{0,0}(f) & F_{1,-1}^{0,0}(f) & F_{1,0}^{0,0}(f) & F_{1,1}^{0,0}(f) & \ldots & F_{L,-L}^{0,0}(f) & \ldots & F_{L,0}^{0,0}(f) & \ldots & F_{L,L}^{0,0}(f) \\
F_{0,0}^{1,-1}(f) & F_{1,-1}^{1,-1}(f) & F_{1,0}^{1,-1}(f) & F_{1,1}^{1,-1}(f) & \ldots & F_{L,-L}^{1,-1}(f) & \ldots & F_{L,0}^{1,-1}(f) & \ldots & F_{L,L}^{1,-1}(f) \\
F_{0,0}^{1,0}(f) & F_{1,-1}^{1,0}(f) & F_{1,0}^{1,0}(f) & F_{1,1}^{1,0}(f) & \ldots & F_{L,-L}^{1,0}(f) & \ldots & F_{L,0}^{1,0}(f) & \ldots & F_{L,L}^{1,0}(f) \\
F_{0,0}^{1,1}(f) & F_{1,-1}^{1,1}(f) & F_{1,0}^{1,1}(f) & F_{1,1}^{1,1}(f) & \ldots & F_{L,-L}^{1,1}(f) & \ldots & F_{L,0}^{1,1}(f) & \ldots & F_{L,L}^{1,1}(f) \\
\vdots & \vdots & \vdots & \vdots & & \vdots & & \vdots & & \vdots \\
F_{0,0}^{L',-L'}(f) & F_{1,-1}^{L',-L'}(f) & F_{1,0}^{L',-L'}(f) & F_{1,1}^{L',-L'}(f) & \ldots & F_{L,-L}^{L',-L'}(f) & \ldots & F_{L,0}^{L',-L'}(f) & \ldots & F_{L,L}^{L',-L'}(f) \\
\vdots & \vdots & \vdots & \vdots & & \vdots & & \vdots & & \vdots \\
F_{0,0}^{L',0}(f) & F_{1,-1}^{L',0}(f) & F_{1,0}^{L',0}(f) & F_{1,1}^{L',0}(f) & \ldots & F_{L,-L}^{L',0}(f) & \ldots & F_{L,0}^{L',0}(f) & \ldots & F_{L,L}^{L',0}(f) \\
\vdots & \vdots & \vdots & \vdots & & \vdots & & \vdots & & \vdots \\
F_{0,0}^{L',L'}(f) & F_{1,-1}^{L',L'}(f) & F_{1,0}^{L',L'}(f) & F_{1,1}^{L',L'}(f) & \ldots & F_{L,-L}^{L',L'}(f) & \ldots & F_{L,0}^{L',L'}(f) & \ldots & F_{L,L}^{L',L'}(f)
\end{bmatrix}$$

Of course, according to the interpolation method used, this optimization step may involve progressive or, on the other hand, sudden variations in the modifications between the portions directly targeted by the distortion pairs and the adjacent portions.

Subsequently, the filtering combinations $F_{l,m}^{l',m'}(f)$ are optionally converted during sub-step 32 and are applied during step 10 as described with reference to FIGS. 3 and 4.

Advantageously, several distortions are applied in succession, the method then comprising a plurality of distortion sub-steps 50 which are recursive with respect to one another, so that each sub-step 50 receives as an input, as nominal processing, the filtering combinations provided by the preceding sub-step.

In the case where the parameter $\lambda$ equals 0, distortion is not applied and the filtering combinations determined during the calculation sub-step 30 correspond directly to the filtering combinations representative of the processing. Thus parameterized, this embodiment corresponds to the first embodiment described with reference to FIGS. 3 and 4.

In another embodiment, only distortion is applied and the filtering combinations are determined solely by means of the distortion pairs in accordance with the relationship:

If $N \leq (L+1)^2$:

$$F=I+(H'-H)(H^T H)^{-1} H^T$$

If $N \geq (L+1)^2$:

$$F=H'H^T(H H^T)^{-1}$$

In these equations, the matrices H and H' are determined as described above. In this case, the matrix C is not used and sub-step 30 is not carried out. Thus, step 2 comprises solely the distortion sub-step 50.

This embodiment is a simplification of the embodiment described when $\lambda$ equals 1 and the nominal processing is neutral processing.

It is therefore apparent that the method of the invention permits the application of a very wide variety of processing operations to a sound field representation having a high level of precision, owing to the use of a set of directivity functions which is representative of the processing operation and which is represented in the form of a set of coefficients corresponding to the decomposition of those functions on a basis of spherical harmonics.

In the case where the processing to be applied can be split into a plurality of elemental processing operations such as described above, the filtering combinations of the processing operation as a whole may be obtained by matrix multiplication of the matrices corresponding to each of the plurality of processing operations, that is to say, by arranging the filtering combinations provided by calculation sub-step 30 and/or distortion sub-step 50.

This processing is thus repeated a plurality of times, the results of each occurrence being combined with those of the previous occurrence.

Figure 6:
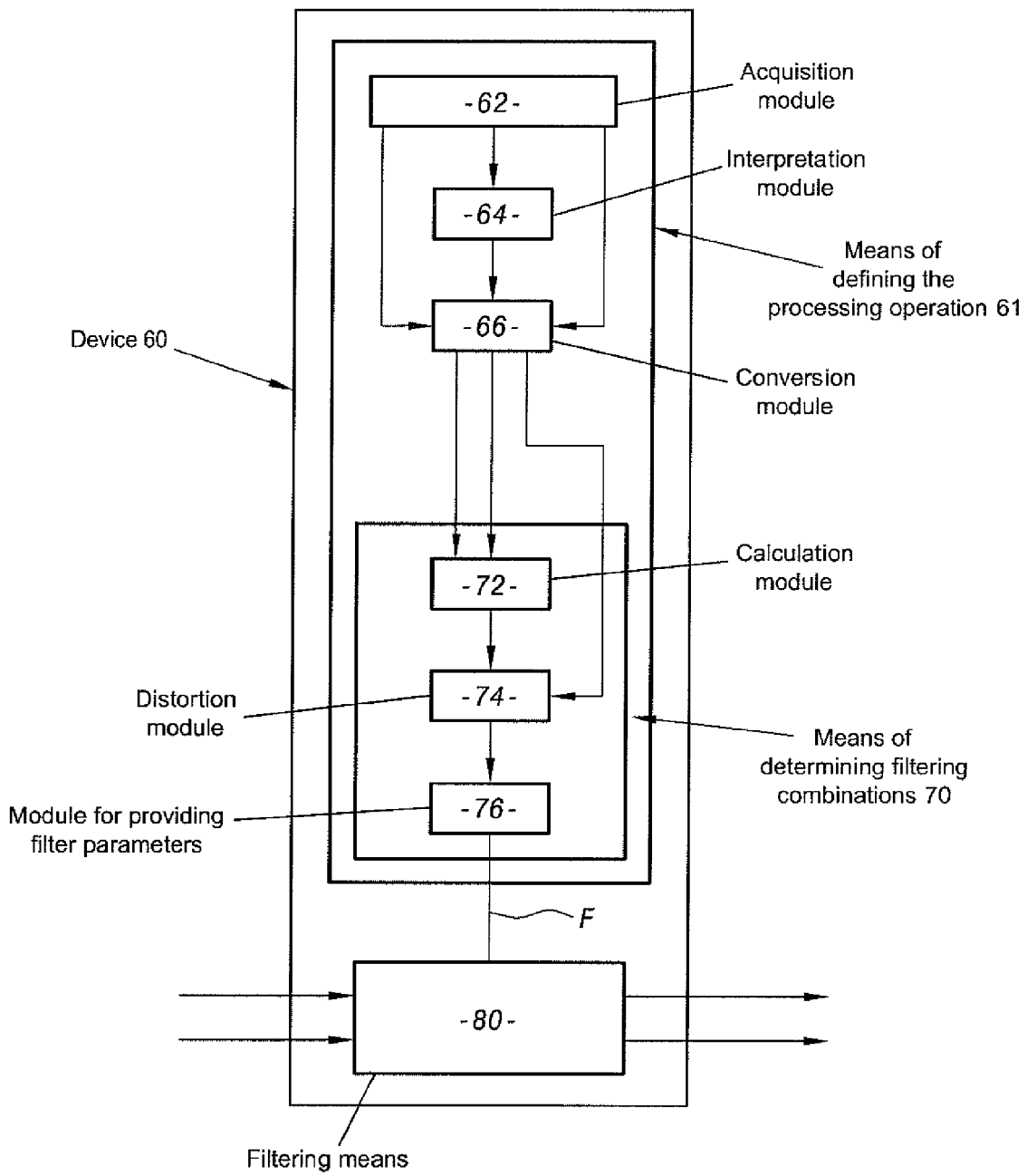
FIG. 6 is a block diagram of a device suitable for implementing the method of the invention.

FIG. 6 shows a block diagram of a device suitable for implementing the method of the invention.

The device 60 permits at least spatial processing of a sound field representation in order to provide a representation modified by the at least spatial processing.

The device 60 comprises means 61 of defining the processing for the implementation of step 2 of the method of the invention. These means 61 comprise means of establishing a set of directivity functions, which is representative of the processing, in the form of a set of coefficients corresponding to the decomposition of those directivity functions on a basis of spherical harmonics.

Advantageously, these means comprise a module 62 for the direct acquisition, by an operator, from a memory or an external device, of operating data for the device 60, permitting, in particular, the direct determination of the set of directivity functions.

For example, the acquisition module 62 is constituted by a keyboard permitting the direct acquisition of data or by an interface with an external device supplying directly the data necessary for the implementation of the method of the invention.

The module 62 may also be used for inputting a processing instruction, and the means 61 then also comprise a module 64 for the automatic interpretation of that instruction, in order to provide operating data for the device 60 and, in particular, the set of directivity functions.

The data entered by means of the module 62 for acquisition and/or 64 for interpretation may also have different predetermined formats and the device 60 comprises a module 66 for converting the data between predetermined formats and selected formats for the implementation of the method of the invention.

In particular, the module 66 enables the set of directivity functions to be converted from one or other of a plurality of formats into a set of coefficients corresponding to their decomposition on a basis of spherical harmonics.

Thus, the modules 62, 64 and 66 permit the implementation of steps 4 and 20 of the method of the invention in order to provide a set of directivity functions representative of the processing operation in the form of the coefficients corresponding to the decomposition of those functions on a basis of spherical harmonics.

In the case where the device 60 is used to carry out distortion processing, the modules 62, 64 and 66 provide directivity functions forming distortion pairs.

The modules 62, 64 and 66 also permit the determination of all or part of a set of parameters necessary for the implementation of the method of the invention.

In particular, those modules 62, 64 and 66 permit the definition of all or some of the following parameters:

the parameter L specifying the limit order of operation of the method and corresponding to the desired mathematical precision limit;

a parameter S defining the nature of the processing operation to be effected;

all or part of the set of constants indicated $c_{l,m,l'',m''}^{l',m'}$ forming weighting coefficients and defined as a function of the nature of the processing operation; and the parameter λ, specifying the magnitude of a distortion to be effected.

Advantageously, the device 60 comprises a memory enabling all or some of those parameters and especially the set of constants to be stored. For example, such a memory comprises a plurality of sets of constants, each corresponding to a processing operation, the set of constants used being selected from that plurality as a function of the parameter S representative of the processing operation.

Alternatively, the means 61 of defining the processing operation comprise a calculation module suitable for determining all or part of the set of constants as a function of the parameter S representative of the nature of the processing operation.

All of these operating data are introduced into means 70 of determining filtering combinations, which means 70 are included in the means 61 of defining the processing operation and are suitable for implementing step 6 of the method. The means 70 comprise a module 72 for calculation by the application of linear combinations permitting the implementation of the calculation sub-step 30 of the method. The module 72 receives the set of directivity functions as an input in order to provide filtering combinations by linear combinations of the coefficients corresponding to the spherical harmonic-based decomposition of the sets of directivity functions representative of the processing operation.

Advantageously, the constants provided by the modules 62, 64 and 66 form weighting coefficients and are used as coefficients of the linear combinations in the module 72.

In the case where the device 60 also uses distortion processing, it also comprises a module 74 for distortion by modification of the filtering combinations provided by the module 72, implementing sub-step 50 of the method. This module receives as an input the distortion pairs representative of the distortion to be applied, as well as the parameter λ representative of the distortion effort used as described above.

In the case where only distortion is applied, the module 72 is not involved in the use of the device and only the distortion module 74 is necessary.

Thus, the means 70 provide a set of coefficients corresponding to filtering combinations representative of the processing to be applied.

Optionally, these filtering combinations are introduced into a conversion module 76 suitable for providing filter parameters from the filtering combinations by implementing sub-step 32 of the method as described above.

These filter parameters or, directly, the filtering combinations are applied to filtering means 80 which implement step 10 of the method and receive as an input the initial representation of the sound field in the form of a set of coefficients which is representative of that field in time and in the three spatial dimensions in order to apply the filters determined in order to provide a modified representation corresponding to the initial sound field modified by the processing defined above.

For example, the filtering means 80 are digital filtering means applied by a signal-processing processor to a digital representation of the initial sound field.

In other embodiments, these filtering means are gain-controlled analogue filtering means applied to an analogue representation of the sound field in the form of a set of signals each corresponding to a coefficient of the initial representation of the sound field.

For example, the device 60 may be in the form of a computer equipped with software means for calculation and hardware means for acquisition and reproduction, in order to permit the use of the data-input means 62 and the acquisition of the initial representation of the sound field and the output of the modified representation of the sound field, the various elements of the device 60 being formed by combinations of software means and hardware means.

In other embodiments the device 60 corresponds to a specific acquisition card dedicated solely to the performance of sound processing or is in the form of a component programmed for the implementation of those functions only.

Advantageously, the device 60 is integrated in a sound system comprising means of acquiring a sound field and means of representing that sound field in the form of a set of coefficients in time and in the three spatial dimensions in order to provide the initial representation of the sound field. Such a system also comprises a reproduction unit controlled by control means receiving as an input the modified representation of the sound field and controlling a reproduction unit in order to obtain the reproduction of the modified sound field.

The invention claimed is:

1. A method for determining filtering combinations of a spatial processing operation, the filtering combinations $$\left(C_{l,m}^{l',m'}\right)$$

being intended to be applied to an initial sound field representation $$(P_{l,m}^{(I)})$$

formed by coefficients representative of the initial sound field in time and in the three spatial dimensions, in order to provide a modified sound field representation $$(P_{l,m}^{(T)})$$

formed by coefficients representative field representative of that field in time and in the three spatial dimensions, the method comprising:
- defining (2) via a programmed computer processor the processing operation by a set of at least one directivity function,
- defining via a programmed processor a predetermined operation applied on the initial sound field representation and the set of at least one directivity function,
- establishing (4) via a programmed computer processor spherical harmonic coefficients of each directivity function;
- determining via a programmed processor weighting coefficients (c) associated with the predetermined operation, wherein determining (6) filtering combinations comprises determining (30) each filtering combination from a linear combination of the spherical harmonic coefficients (G) with the weighting coefficients (c), and
- determining (6) via a programmed computer processor the filtering combinations from the spherical harmonic coefficients.

2. The method of claim 1, wherein the coefficients representative of the initial sound field and the coefficients representative of the modified sound field, are Fourier-Bessel coefficients.

3. The method of claim 2, further comprising specifying a parameter (L) representing the order limit of the Fourier-Bessel coefficients.

4. The method of claim 1, wherein the predetermined operation is the multiplication operation, for each direction, of the value of the directivity function of the initial sound field and the directivity function of the processing operation.

5. The method of claim 4, wherein the weighting coefficients of the multiplication operation, noted $c_{l,m,l'',m''}^{l',m'}$, are given by:

$$c_{l,m,l'',m''}^{l',m'} = \begin{cases} \frac{1}{\sqrt{2}}\left(c_{l,m,l'',m''}^{l',m'(1)} + c_{l,-m,l'',m''}^{l',m'(1)}\right) & \text{for } m > 0 \\ c_{l,0,l'',m''}^{l',m'(1)} & \text{for } m = 0 \\ \frac{j}{\sqrt{2}}\left(c_{l,-m,l'',m''}^{l',m'(1)} - c_{l,m,l'',m''}^{l',m'(1)}\right) & \text{for } m < 0 \end{cases}$$

with $$c_{l,m,l'',m''}^{l',m'(1)} = \begin{cases} \frac{1}{\sqrt{2}}\left(c_{l,m,l'',m''}^{l',m'(2)} + c_{l,m,l'',-m''}^{l',m'(2)}\right) & \text{for } m'' > 0 \\ c_{l,m,l'',0}^{l',m'(2)} & \text{for } m'' = 0 \\ \frac{j}{\sqrt{2}}\left(c_{l,m,l'',-m''}^{l',m'(2)} - c_{l,m,l'',m''}^{l',m'(2)}\right) & \text{for } m'' < 0 \end{cases}$$

with $$c_{l,m,l'',m''}^{l',m'(2)} = \begin{cases} \frac{1}{\sqrt{2}}\left(c_{l,m,l'',m''}^{l',m'(3)} + c_{l,m,l'',m''}^{l',-m'(3)}\right) & \text{for } m' > 0 \\ c_{l,m,l'',m''}^{l',0(3)} & \text{for } m' = 0 \\ \frac{1}{j\sqrt{2}}\left(c_{l,m,l'',m''}^{l',-m'(3)} - c_{l,m,l'',m''}^{l',m'(3)}\right) & \text{for } m' < 0 \end{cases}$$

with $$c_{l,m,l'',m''}^{l',m'(3)} = \delta_{m''}^{m'-m}\frac{1}{2\sqrt{\pi}}\frac{\sqrt{(2l+1)(2l'+1)(2l''+1)}}{l+l'+l''+1}\sqrt{\frac{C_{l+|m|}^{l}C_{l'+|m'|}^{l'}C_{l''+|m''|}^{l''}}{C_{l}^{|m|}C_{l'}^{|m'|}C_{l''}^{|m''|}}} \times$$

$$\sum_{k=|m|}^{l}\sum_{k'=|m'|}^{l'}\sum_{k''=|m''|}^{l''}(-1)^{k+k'+k''}\frac{C_{l}^{k}C_{l}^{k-|m|}C_{l'}^{k'}C_{l'}^{k'-|m'|}C_{l''}^{k''}C_{l''}^{k''-|m''|}}{C_{l+l'+l''}^{k+k'+k''-n}}$$

and $$\delta_x^y = \begin{cases} 1 & \text{for } x = y \\ 0 & \text{for } x \neq y \end{cases}$$

and $$n = \frac{|m|+|m'|+|m''|}{2}$$

and $$C_n^p = \frac{n!}{p!(n-p)!}.$$

6. The method of claim 1, wherein the predetermined operation is the convolution operation, for each direction, of the value of the directivity function of the initial sound field and the directivity function of the processing operation.

7. The method of claim 4, wherein the weighting coefficients of the convolution operation, noted $c_{l,m,l'',m''}^{l',m'}$, are given by:

$$c_{l,m,l'',m''}^{l',m'} = \begin{cases} \frac{1}{\sqrt{2}}\left(c_{l,m,l'',m''}^{l',m'(1)} + c_{l,-m,l'',m''}^{l',m'(1)}\right) & \text{for } m > 0 \\ c_{l,0,l'',m''}^{l',m'(1)} & \text{for } m = 0 \\ \frac{j}{\sqrt{2}}\left(c_{l,-m,l'',m''}^{l',m'(1)} - c_{l,m,l'',m''}^{l',m'(1)}\right) & \text{for } m < 0 \end{cases}$$

with $$c_{l,m,l'',m''}^{l',m'(1)} = \begin{cases} \frac{1}{\sqrt{2}}\left(c_{l,m,l'',m''}^{l',m'(2)} + c_{l,m,l'',-m''}^{l',m'(2)}\right) & \text{for } m'' > 0 \\ c_{l,m,l'',0}^{l',m'(2)} & \text{for } m'' = 0 \\ \frac{j}{\sqrt{2}}\left(c_{l,m,l'',-m''}^{l',m'(2)} - c_{l,m,l'',m''}^{l',m'(2)}\right) & \text{for } m'' < 0 \end{cases}$$

-continued with $$c_{l,m,l'',m''}^{l',m'(2)} = \begin{cases} \frac{1}{\sqrt{2}}\left(c_{l,m,l'',m''}^{l',m'(3)} + c_{l,m,l'',m''}^{l',-m'(3)}\right) & \text{for } m' > 0 \\ c_{l,m,l'',m''}^{l',0(3)} & \text{for } m' = 0 \\ \frac{1}{j\sqrt{2}}\left(c_{l,m,l'',m''}^{l',-m'(3)} - c_{l,m,l'',m''}^{l',m'(3)}\right) & \text{for } m' < 0 \end{cases}$$

with $$c_{l,m,l'',m''}^{l',m'(3)} = \delta_{l''}^{l'}\delta_{m''}^{m'-m}2\sqrt{\pi}\,\varepsilon_{m'}^{m'}\varepsilon_{m''}^{m''}\frac{\sqrt{2l+1}}{l'+l+1}\sqrt{\frac{C_{l+|m|}^{l}C_{l'+|m'|}^{l'}C_{l''+|m''|}^{|m''|}}{C_l^{|m|}C_{l'}^{|m'|}C_{l'+|m''|}^{l'}}}$$

$$\sum_{k=|m|}^{l} C_l^k C_l^{k-|m|} \times \sum_{p=\max(0,-m)}^{\min(l'-m',l'+m'')} (-1)^{p+k+m} C_{l'+m''}^{p} C_{l'-m'}^{p+m} \times$$

$$\begin{cases} 1/C_{l'+l}^{p+k} & \text{if } m \geq 0 \\ 1/C_{l'+l}^{p+k+m} & \text{if } m \leq 0 \end{cases}$$

and $$\varepsilon_m^m = (\text{sign}(m))^m.$$

8. The method according to claim 1,
wherein the processing operation is a distortion,
wherein the set of at least one directivity function comprises N pairs of directivity functions which form a set of distortion pairs representative of the distortion, and
wherein the filtering combinations are determined from the spherical harmonic coefficients of the N pairs of directivity functions.

9. A method for applying a spatial processing operation to an initial sound field, the method comprising:
establishing an initial sound field representation formed by coefficients representative of the initial sound field in time and in the three spatial dimensions,
determining filtering combinations of the processing operation, according to the method of claim 1, and
applying the filtering combinations to the initial sound field representation,
wherein at least one processing operation is a rotation operation,
the method further comprising:
determining the filtering combinations of the rotation operation according to the parameters $(\theta,\phi,\psi)$ representative of the rotation, according to:

$$C_{l,m}^{l',m'} = \delta_l^{l'} D_{m',m}^{lR}$$

-continued with $$D_{m',m}^{lR} = \begin{cases} \Re(D_{m',m}^l + D_{-m',m}^l) & \text{if } m' > 0 \text{ and } m > 0 \\ \sqrt{2}\,\Re(D_{m',0}^l) & \text{if } m' > 0 \text{ and } m = 0 \\ \Im(D_{m',m}^l + D_{-m',m}^l) & \text{if } m' > 0 \text{ and } m < 0 \\ \sqrt{2}\,\Re(D_{0,m}^l) & \text{if } m' = 0 \text{ and } m > 0 \\ D_{0,0}^l & \text{if } m' = 0 \text{ and } m = 0 \\ \sqrt{2}\,\Im(D_{0,m}^l) & \text{if } m' = 0 \text{ and } m < 0 \\ \Im(D_{-m',m}^l - D_{m',m}^l) & \text{if } m' < 0 \text{ and } m > 0 \\ -\sqrt{2}\,\Im(D_{m',0}^l) & \text{if } m' < 0 \text{ and } m = 0 \\ \Re(D_{m',m}^l - D_{-m',m}^l) & \text{if } m' < 0 \text{ and } m < 0 \end{cases}$$

with $$D_{m',m}^l = \varepsilon_m^m \varepsilon_{m'}^{m'} d_{m',m}^l(\theta) e^{-jm'\phi} e^{-jm\psi}$$

with $$d_{m',m}^l(\theta) = \sqrt{\frac{(l+m')!(l-m')!}{(l+m)!(l-m)!}} \sum_{k=\max(0,m-m')}^{\min(l-m',l+m)} (-1)^k C_{l+m}^k C_{l-m}^{k+m'-m} \times$$

$$\left(\cos\frac{\theta}{2}\right)^{2l+m-m'-2k}\left(\sin\frac{\theta}{2}\right)^{2k+m'-m}$$

and $$\Re(x) = \text{real part}(x).$$

and $$\Im(x) = \text{imaginary part}(x).$$

10. A method for applying a combination of spatial processing operations to an initial sound field, the method comprising:
establishing an initial sound field representation formed by coefficients representative of the initial sound field in time and in the three spatial dimensions,
determining filtering combinations of each processing operation, the filtering combinations being applied to the initial sound field representation, in order to provide a modified sound field representation formed by coefficients representative of that field in time and in the three spatial dimensions, wherein the filtering combinations of at least one processing operation is achieved by the method of claim 1,
determining overall filtering combinations by combining the filtering combinations of each processing operation, and
applying the overall filtering combinations to the initial sound field representation,
wherein at least one processing operation is a rotation operation,
the method further comprising:
determining the filtering combinations of the rotation operation according to the parameters $(\theta,\phi,\psi)$ representative of the rotation, according to:

$$C_{l,m}^{l',m'} = \delta_l^{l'} D_{m',m}^{lR}$$

-continued with $$D_{m',m}^{lR} = \begin{cases} \Re(D_{m',m}^l + D_{-m',m}^l) & \text{if } m' > 0 \text{ and } m > 0 \\ \sqrt{2}\,\Re(D_{m',0}^l) & \text{if } m' > 0 \text{ and } m = 0 \\ \Im(D_{m',m}^l + D_{-m',m}^l) & \text{if } m' > 0 \text{ and } m < 0 \\ \sqrt{2}\,\Re(D_{0,m}^l) & \text{if } m' = 0 \text{ and } m > 0 \\ D_{0,0}^l & \text{if } m' = 0 \text{ and } m = 0 \\ \sqrt{2}\,\Im(D_{0,m}^l) & \text{if } m' = 0 \text{ and } m < 0 \\ \Im(D_{-m',m}^l - D_{m',m}^l) & \text{if } m' < 0 \text{ and } m > 0 \\ -\sqrt{2}\,\Im(D_{m',0}^l) & \text{if } m' < 0 \text{ and } m = 0 \\ \Re(D_{m',m}^l - D_{-m',m}^l) & \text{if } m' < 0 \text{ and } m < 0 \end{cases}$$

with $$D_{m',m}^l = \varepsilon_m^m \varepsilon_{m'}^{m'} d_{m',m}^l(\theta) e^{-jm'\phi} e^{-jm\psi}$$

with $$d_{m',m}^l(\theta) = \sqrt{\frac{(l+m')!(l-m')!}{(l+m)!(l-m)!}} \sum_{k=\max(0,m-m')}^{\min(l-m',l+m)} (-1)^k C_{l+m}^k C_{l-m}^{k+m'-m} \times \left(\cos\frac{\theta}{2}\right)^{2l+m-m'-2k} \left(\sin\frac{\theta}{2}\right)^{2k+m'-m}$$

and $\Re(x) = \text{real part}(x)$ and $\Im(x) = \text{imaginary part}(x)$.

11. A device for determining filtering combinations of a spatial processing operation, the filtering combinations $$\left(C_{l,m}^{l',m'}\right)$$

being intended to be applied to an initial sound field representation $$\left(P_{l,m}^{(l)}\right)$$

formed by coefficients representative of the initial sound field in time and in the three spatial dimensions, in order to provide a modified sound field representation $$\left(P_{l,m}^{(T)}\right)$$

formed by coefficients representative field representative of that field in time and in the three spatial dimensions, the device comprising:
a processor programmed to include:
means for defining the processing operation by a set of at least one directivity function,
means for defining a predetermined operation applied on the initial sound field representation and the set of at least one directivity function,
means for establishing spherical harmonic coefficients of each directivity function;
means for determining weighting coefficients (c) associated with the predetermined operation, wherein determining (6) filtering combinations comprises determining (30) each filtering combination from a linear combination of the spherical harmonic coefficients (G) with the weighting coefficients (c), and
means for determining the filtering combinations from the spherical harmonic coefficients.

12. The device of claim 11, wherein the coefficients representative of the initial sound field and the coefficients representative of the modified sound field, are Fourier-Bessel coefficients.

13. The device of claim 12, further comprising means for specifying a parameter (L) representing the order limit of the Fourier-Bessel coefficients.

14. The device of claim 11, wherein the predetermined operation is the multiplication operation, for each direction, of the value of the directivity function of the initial sound field and the directivity function of the processing operation.

15. The device of claim 14, wherein the weighting coefficients of the multiplication operation, noted $c_{l,m,l'',m''}^{l',m'}$, are given by:

$$c_{l,m,l'',m''}^{l',m'} = \begin{cases} \frac{1}{\sqrt{2}}\left(c_{l,m,l'',m''}^{l',m'(1)} + c_{l,-m,l'',m''}^{l',m'(1)}\right) & \text{for } m > 0 \\ c_{l,0,l'',m''}^{l',m'(1)} & \text{for } m = 0 \\ \frac{j}{\sqrt{2}}\left(c_{l,-m,l'',m''}^{l',m'(1)} - c_{l,m,l'',m''}^{l',m'(1)}\right) & \text{for } m < 0 \end{cases}$$

with $$c_{l,m,l'',m''}^{l',m'(1)} = \begin{cases} \frac{1}{\sqrt{2}}\left(c_{l,m,l'',m''}^{l',m'(2)} + c_{l,m,l'',-m''}^{l',m'(2)}\right) & \text{for } m'' > 0 \\ c_{l,m,l'',0}^{l',m'(2)} & \text{for } m'' = 0 \\ \frac{j}{\sqrt{2}}\left(c_{l,m,l'',-m''}^{l',m'(2)} - c_{l,m,l'',m''}^{l',m'(2)}\right) & \text{for } m'' < 0 \end{cases}$$

with $$c_{l,m,l'',m''}^{l',m'(2)} = \begin{cases} \frac{1}{\sqrt{2}}\left(c_{l,m,l'',m''}^{l',m'(3)} + c_{l,m,l'',m''}^{l',-m'(3)}\right) & \text{for } m' > 0 \\ c_{l,m,l'',m''}^{l',0(3)} & \text{for } m' = 0 \\ \frac{1}{j\sqrt{2}}\left(c_{l,m,l'',m''}^{l',-m'(3)} - c_{l,m,l'',m''}^{l',m'(3)}\right) & \text{for } m' < 0 \end{cases}$$

with $$c_{l,m,l'',m''}^{l',m'(3)} = \delta_{m'}^{m'-m} \frac{1}{2\sqrt{\pi}} \frac{\sqrt{(2l+1)(2l'+1)(2l''+1)}}{l+l'+l''+1} \sqrt{\frac{C_{l+|m|}^l C_{l'+|m'|}^{l'} C_{l''+|m''|}^{l''}}{C_l^{|m|} C_{l'}^{|m'|} C_{l''}^{|m''|}}} \times$$

$$\sum_{k=|m|}^{l} \sum_{k'=|m'|}^{l'} \sum_{k''=|m''|}^{l''} (-1)^{k+k'+k''} \frac{C_l^k C_l^{k-|m|} C_{l'}^{k'} C_{l'}^{k'-|m'|} C_{l''}^{k''} C_{l''}^{k''-|m''|}}{C_{l+l'+l''}^{k+k'+k''-n}}$$

and $$\delta_x^y = \begin{cases} 1 & \text{for } x = y \\ 0 & \text{for } x \neq y \end{cases}$$

and $$n = \frac{|m| + |m'| + |m''|}{2}$$

-continued and $$C_n^p = \frac{n!}{p!(n-p)!}.$$

16. The device of claim 11, wherein the predetermined operation is the convolution operation, for each direction, of the value of the directivity function of the initial sound field and the directivity function of the processing operation.

17. The device of claim 16, wherein the weighting coefficients of the convolution operation, noted $c_{l,m,l'',m''}^{l',m'}$, are given by:

$$c_{l,m,l'',m''}^{l',m'} = \begin{cases} \frac{1}{\sqrt{2}}\left(c_{l,m,l'',m''}^{l',m'(1)} + c_{l,-m,l'',m''}^{l',m'(1)}\right) & \text{for } m > 0 \\ c_{l,0,l'',m''}^{l',m'(1)} & \text{for } m = 0 \\ \frac{j}{\sqrt{2}}\left(c_{l,-m,l'',m''}^{l',m'(1)} - c_{l,m,l'',m''}^{l',m'(1)}\right) & \text{for } m < 0 \end{cases}$$

with $$c_{l,m,l'',m''}^{l',m'(1)} = \begin{cases} \frac{1}{\sqrt{2}}\left(c_{l,m,l'',m''}^{l',m'(2)} + c_{l,m,l'',-m''}^{l',m'(2)}\right) & \text{for } m'' > 0 \\ c_{l,m,l'',0}^{l',m'(2)} & \text{for } m'' = 0 \\ \frac{j}{\sqrt{2}}\left(c_{l,m,l'',-m''}^{l',m'(2)} - c_{l,m,l'',m''}^{l',m'(2)}\right) & \text{for } m'' < 0 \end{cases}$$

with $$c_{l,m,l'',m''}^{l',m'(2)} = \begin{cases} \frac{1}{\sqrt{2}}\left(c_{l,m,l'',m''}^{l',m'(3)} + c_{l,m,l'',m''}^{l',-m'(3)}\right) & \text{for } m' > 0 \\ c_{l,m,l'',m''}^{l',0(3)} & \text{for } m' = 0 \\ \frac{1}{j\sqrt{2}}\left(c_{l,m,l'',m''}^{l',-m'(3)} - c_{l,m,l'',m''}^{l',m'(3)}\right) & \text{for } m' < 0 \end{cases}$$

with $$c_{l,m,l'',m''}^{l',m'(3)} = \delta_{l''}^{l} \delta_{m''}^{m'-m} 2\sqrt{\pi}\, \varepsilon_{m'}^{m'} \varepsilon_{m''}^{m''} \frac{\sqrt{2l+1}}{l'+l+1} \sqrt{\frac{C_{l+|m|}^{l} C_{l'+|m'|}^{l'} C_{l'}^{|m''|}}{C_{l}^{|m|} C_{l'}^{|m'|} C_{l'+|m''|}^{l'}}}$$

$$\sum_{k=|m|}^{l} C_l^k C_l^{k-|m|} \times \sum_{p=max(0,-m)}^{min(l'-m',l'+m'')} (-1)^{p+k+m} C_{l'+m''}^{p} C_{l'-m''}^{p+m} \times$$

$$\begin{cases} 1/C_{l'+l}^{p+k} & \text{if } m \geq 0 \\ 1/C_{l'+l}^{p+k+m} & \text{if } m \leq 0 \end{cases}$$

and $$\varepsilon_m^m = (\text{sign}(m))^m.$$

18. The device according to claim 11,
wherein the processing operation is a distortion,
wherein the set of at least one directivity function comprises N pairs of directivity functions which form a set of distortion pairs representative of the distortion, and
wherein the filtering combinations are determined from the spherical harmonic coefficients of the N pairs of directivity functions.

\* \* \* \* \*